United States Patent
Pitbladdo

(10) Patent No.: US 7,690,221 B2
(45) Date of Patent: Apr. 6, 2010

(54) SHEET WIDTH CONTROL FOR OVERFLOW DOWNDRAW SHEET GLASS FORMING APPARATUS

(75) Inventor: Richard Bruce Pitbladdo, Naples, FL (US)

(73) Assignee: Corning Incorporated, Corning, NY (US)

( * ) Notice: Subject to any disclaimer, the term of this patent is extended or adjusted under 35 U.S.C. 154(b) by 769 days.

(21) Appl. No.: 11/060,139

(22) Filed: Feb. 17, 2005

(65) Prior Publication Data

US 2005/0183455 A1 Aug. 25, 2005

Related U.S. Application Data

(60) Provisional application No. 60/546,875, filed on Feb. 23, 2004, provisional application No. 60/576,274, filed on Jun. 2, 2004, provisional application No. 60/599,620, filed on Aug. 6, 2004, provisional application No. 60/623,783, filed on Oct. 29, 2004.

(51) Int. Cl.
   *C03B 17/00* (2006.01)
(52) U.S. Cl. .................. 65/195; 65/53; 65/98
(58) Field of Classification Search ............ 65/45, 65/52, 53, 66, 90, 98, 126, 195, 121
   See application file for complete search history.

(56) References Cited

U.S. PATENT DOCUMENTS

| | | |
|---|---|---|
| 1,565,319 A | 12/1925 | Fowle |
| 1,673,907 A | 6/1928 | Ferngren |
| 1,697,227 A | 1/1929 | Danner |
| 1,731,260 A | 10/1929 | Nobbe |
| 1,759,229 A | 5/1930 | Drake |
| 1,829,639 A | 10/1931 | Ferngren |
| 1,829,641 A | 10/1931 | Ferngren |
| 1,841,579 A | 1/1932 | Fraser |
| 1,891,370 A | 12/1932 | Danner |
| 3,149,949 A | 9/1964 | Dockerty et al. ............ 65/53 |
| 3,338,696 A | 8/1967 | Dockerty ............ 65/145 |
| 3,433,613 A | 3/1969 | Dockerty ............ 65/145 |
| 3,437,470 A | 4/1969 | Overman ............ 65/195 |
| 3,451,798 A | 6/1969 | Simon ............ 65/199 |

(Continued)

FOREIGN PATENT DOCUMENTS

DE 1596402 12/1967

(Continued)

OTHER PUBLICATIONS

Varshneya, Arun, "Fundamentals of Inorganic Glasses", Academic Press, Inc., 1994, pp. 534-540.

(Continued)

*Primary Examiner*—Eric Hug
*Assistant Examiner*—Queenie Dehghan
(74) *Attorney, Agent, or Firm*—Siwen Chen

(57) ABSTRACT

A method keeps the width of the manufactured sheet substantially the same by attaching edge directors for the formed sheet to the manufacturing apparatus structure instead of to the forming block. Thus, sheet glass may be manufactured to specification for a longer time with the same forming block. An additional method adjusts the width of the manufactured sheet by changing the distance between the edge directors. Thus sheet glass may be manufactured to different width specifications with the same forming block.

10 Claims, 31 Drawing Sheets

U.S. PATENT DOCUMENTS

| | | | | |
|---|---|---|---|---|
| 3,506,429 | A | 4/1970 | Overman | 65/203 |
| 3,519,411 | A | 7/1970 | Cortright et al. | 65/90 |
| 3,589,887 | A | 6/1971 | Ward | 65/195 |
| 3,607,182 | A | 9/1971 | Leibowitz | 65/53 |
| 3,682,609 | A | 8/1972 | Dockerty | 65/83 |
| 3,723,082 | A | 3/1973 | Knowles et al. | 65/84 |
| 4,214,886 | A | 7/1980 | Shay et al. | 62/121 |
| 4,389,725 | A | 6/1983 | Barkhau et al. | |
| 4,416,678 | A | 11/1983 | Bottger | 65/2 |
| 4,738,706 | A | 4/1988 | Picinelli | |
| 5,374,595 | A | 12/1994 | Dumbaugh, Jr. et al. | 501/66 |
| 6,319,867 | B1 | 11/2001 | Chacon et al. | 501/66 |
| 6,748,765 | B2 | 6/2004 | Pitbladdo | |
| 6,889,526 | B2 | 5/2005 | Pitbladdo | |
| 6,895,782 | B2 | 5/2005 | Pitbladdo | |
| 6,974,786 | B2 | 12/2005 | Helfinstine et al. | |
| 6,990,834 | B2 | 1/2006 | Pitbladdo | |
| 6,997,017 | B2 | 2/2006 | Pitbladdo | |
| 7,155,935 | B2 | 1/2007 | Pitbladdo | |
| 2003/0029199 | A1 | 2/2003 | Pitbladdo | 65/195 |
| 2003/0110804 | A1 | 6/2003 | Fenn et al. | 65/90 |
| 2003/0192349 | A1 | 10/2003 | Meda et al. | 65/53 |
| 2004/0055338 | A1 | 3/2004 | Helfinstine et al. | 65/374.13 |
| 2006/0016219 | A1 | 1/2006 | Pitbladdo | |

FOREIGN PATENT DOCUMENTS

| | | |
|---|---|---|
| DE | 1596403 | 12/1967 |
| DE | 21 58 253 | 11/1971 |
| DE | 3113505 | 1/1983 |
| DE | 31 11484 A1 | 2/1983 |
| DE | 33 16795 | 11/1983 |
| DE | 31 11484 C2 | 12/1983 |
| DE | 33 14540 | 12/1983 |
| DE | 3329843 | 5/1984 |
| DE | 3507852 | 8/1985 |
| DE | 3518137 | 1/1986 |
| DE | 43 36 046 | 10/1993 |
| DE | 43 26 143 | 12/1993 |
| DE | 196 44 673 | 4/1998 |
| DE | 198 09 878 | 9/1999 |
| DE | 198 40 113 | 3/2000 |
| DE | 19964043 | 7/2001 |
| DE | 100 21 013 | 11/2001 |
| DE | 100 28 741 | 12/2001 |
| FR | 1549081 | 12/1967 |
| FR | 1549915 | 1/1968 |
| GB | 982153 | 2/1965 |
| GB | 1200401 | 7/1970 |
| GB | 1354006 | 6/1974 |
| JP | 09110443 | 4/1997 |
| JP | 10291827 | 11/1998 |
| JP | 11-246230 | 9/1999 |
| JP | 2001-80922 | 9/1999 |

OTHER PUBLICATIONS

Snyder, R.D./Byars, E.F., "Engineering Mechanics", McGraw-Hill Book Company, 1973, pp. 349-350.

Kingery, W.D.; Bowen, H.K.; Uhlmann, D.R., "Introduction to Ceramics", John Wiley & Sons, 1976, pp. 705-767.

Bottger, et al.; "LCD substrate—the future process" International Glass Review, Issue 2—2000; 3 pages.

Bocko, Peter L. and Mitchell, Mark H. "AMLCD Glass Substrates—Foundation for High-Tech Displays" The GlassReseacher, vol. 12, No. 1, pp. 26-29, 2002.

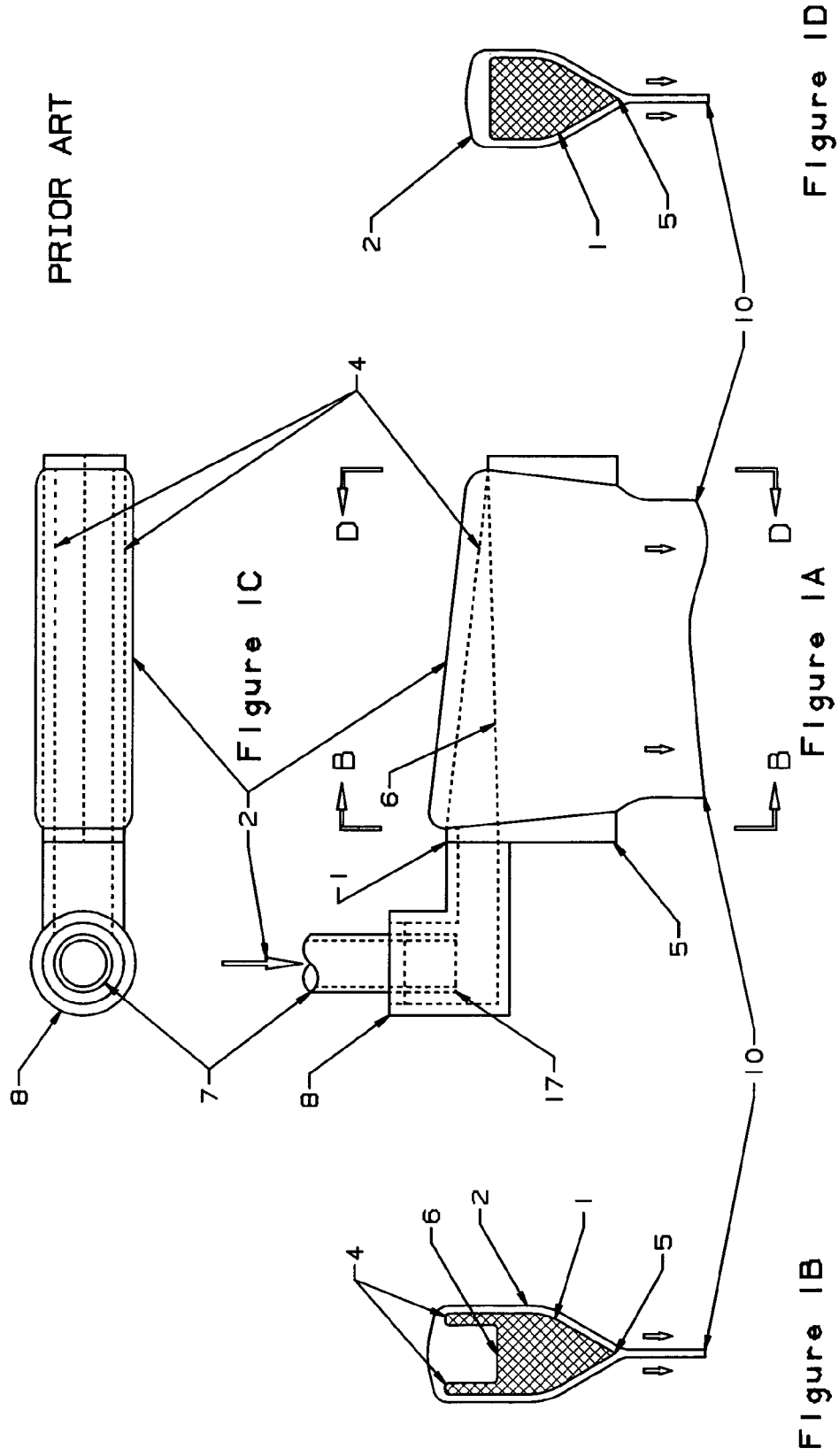

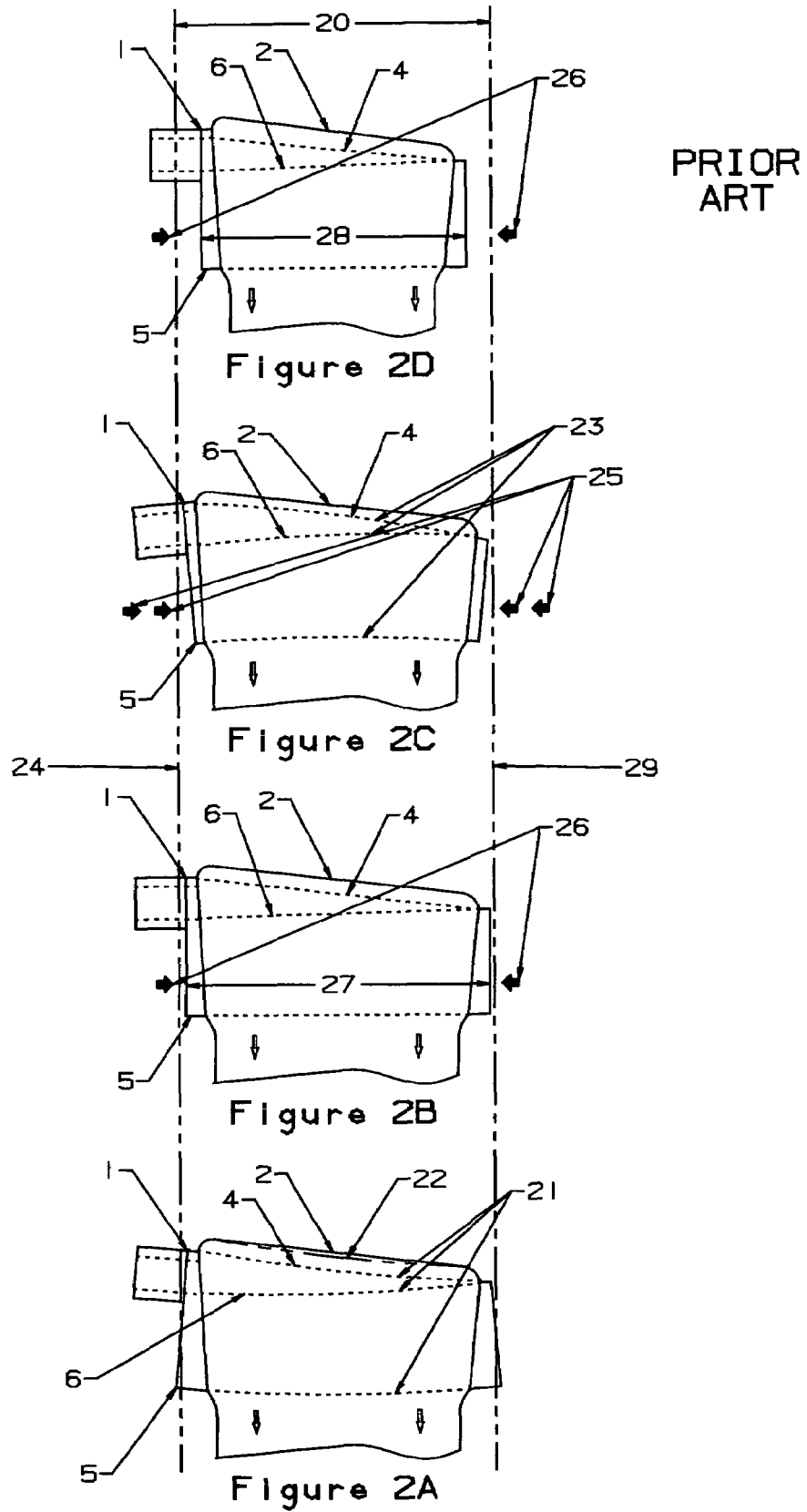

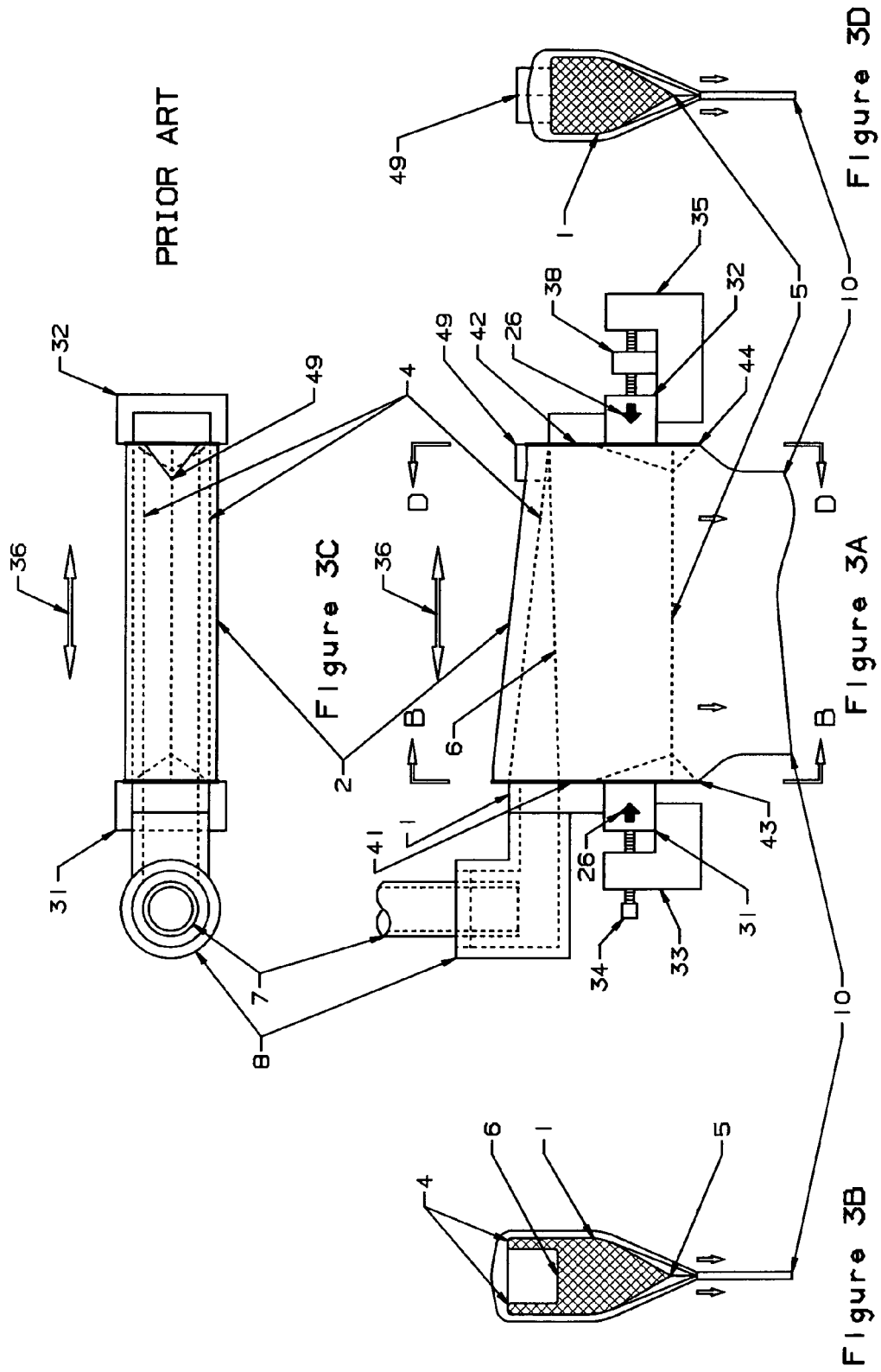

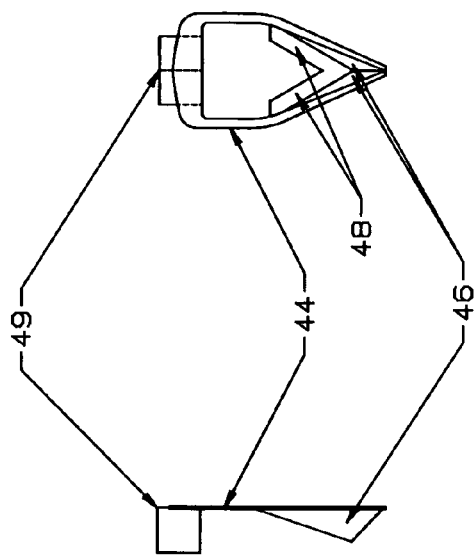
Figure 4E
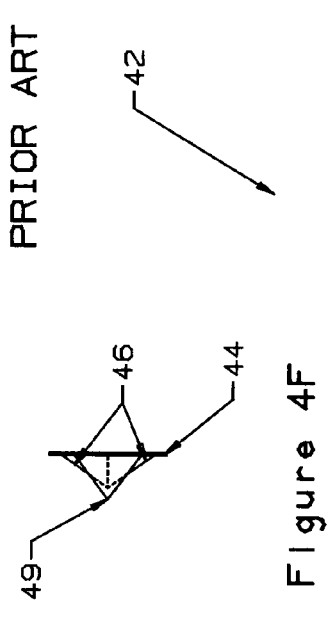
Figure 4F
Figure 4D
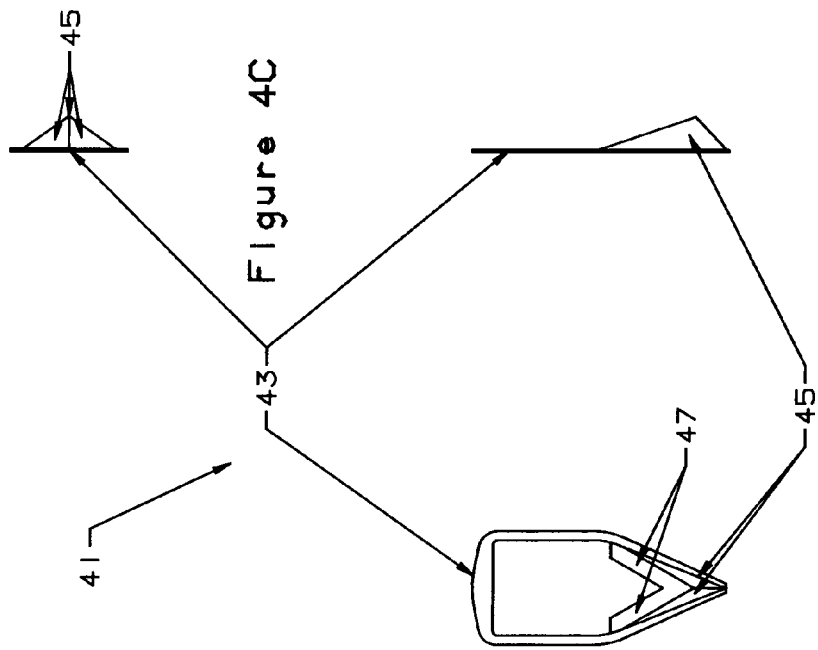
Figure 4C
Figure 4A
Figure 4B

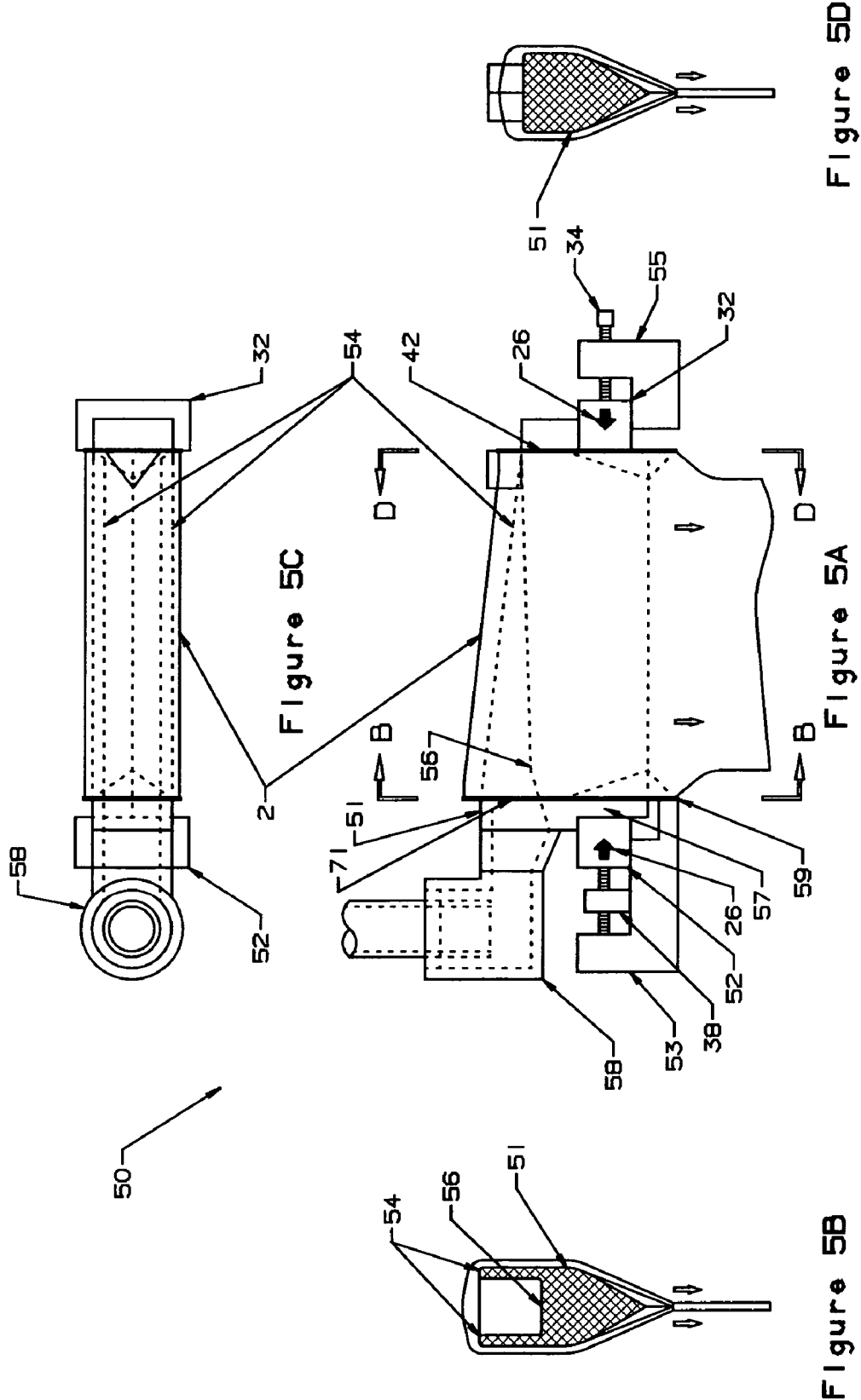

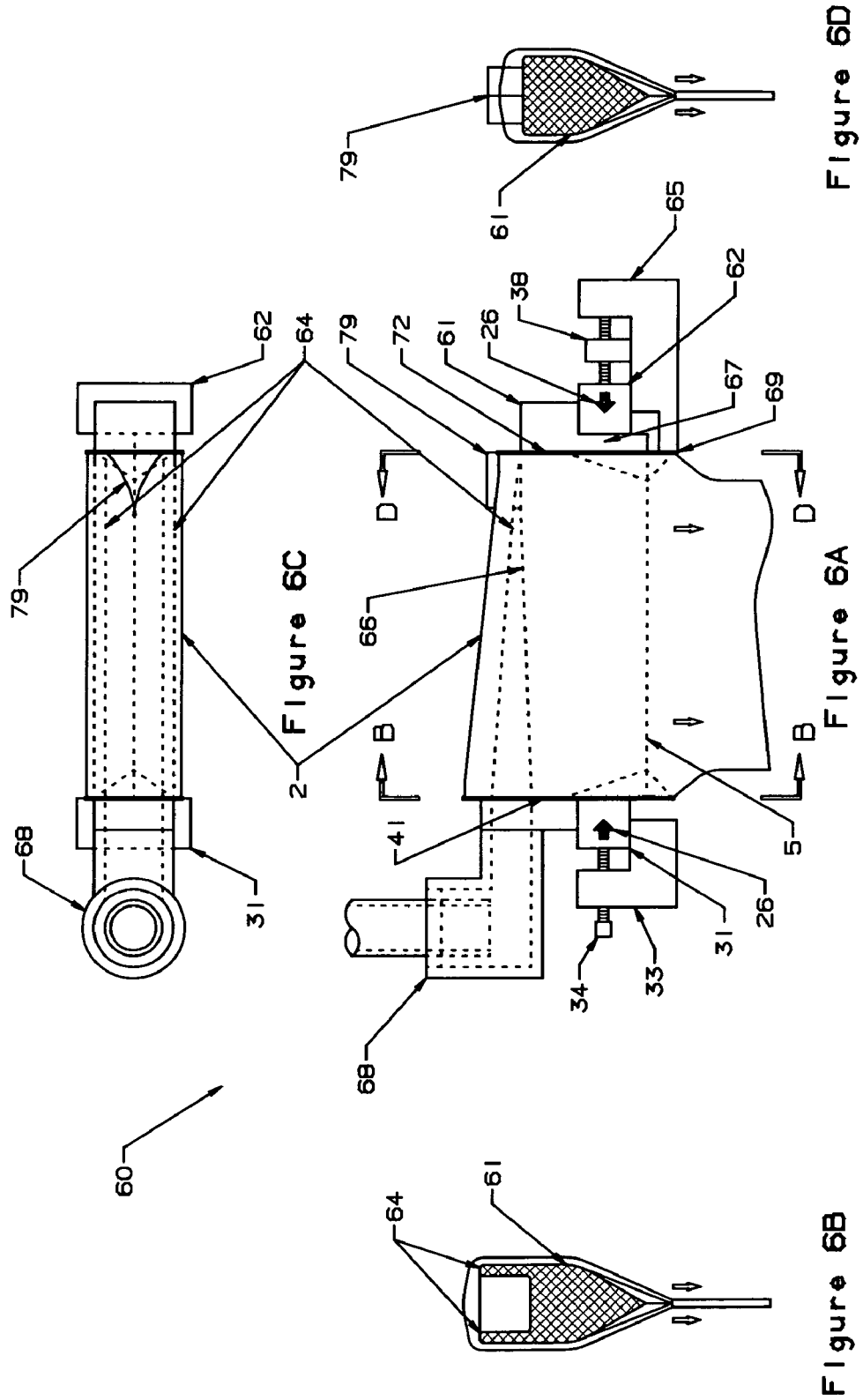

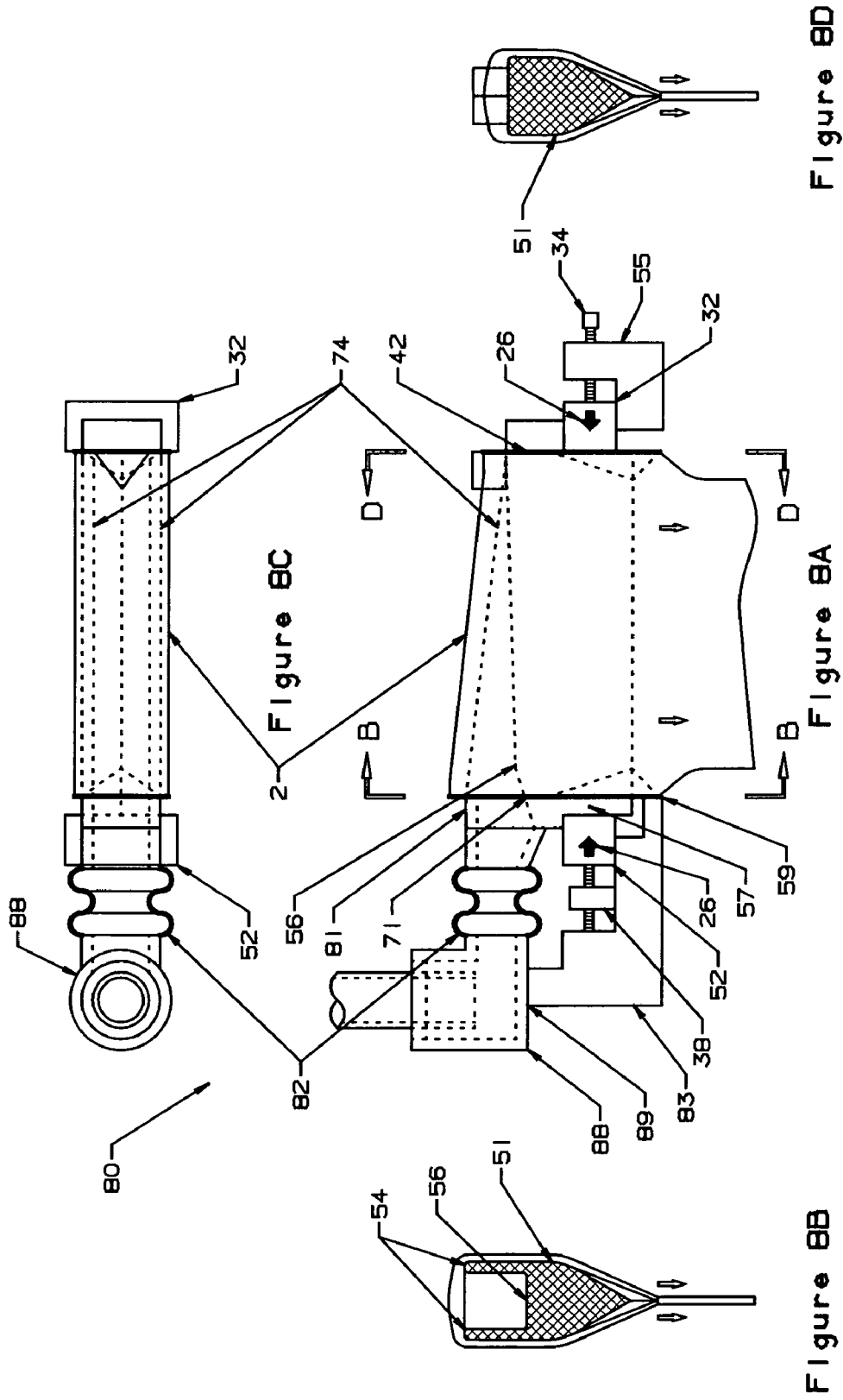

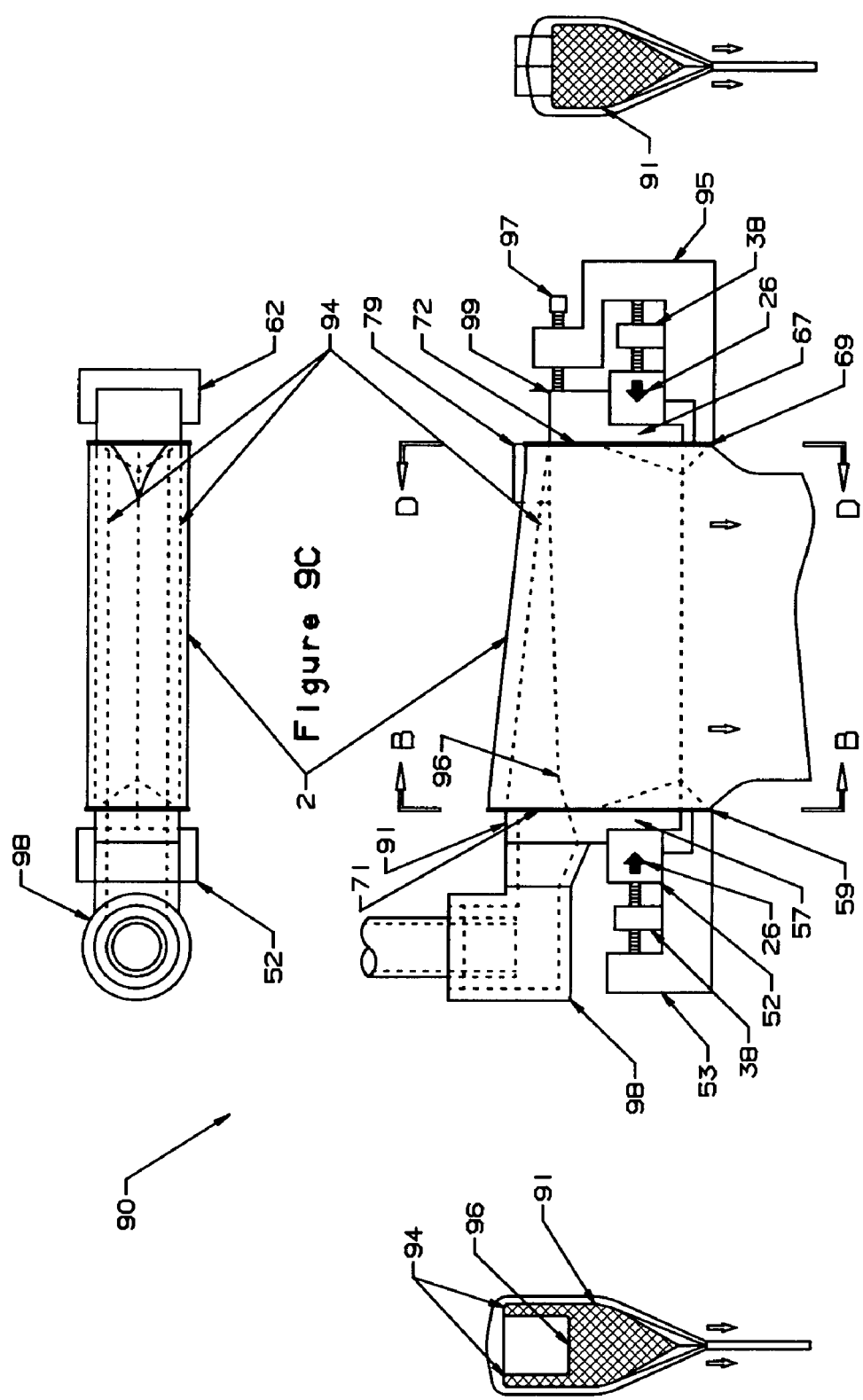

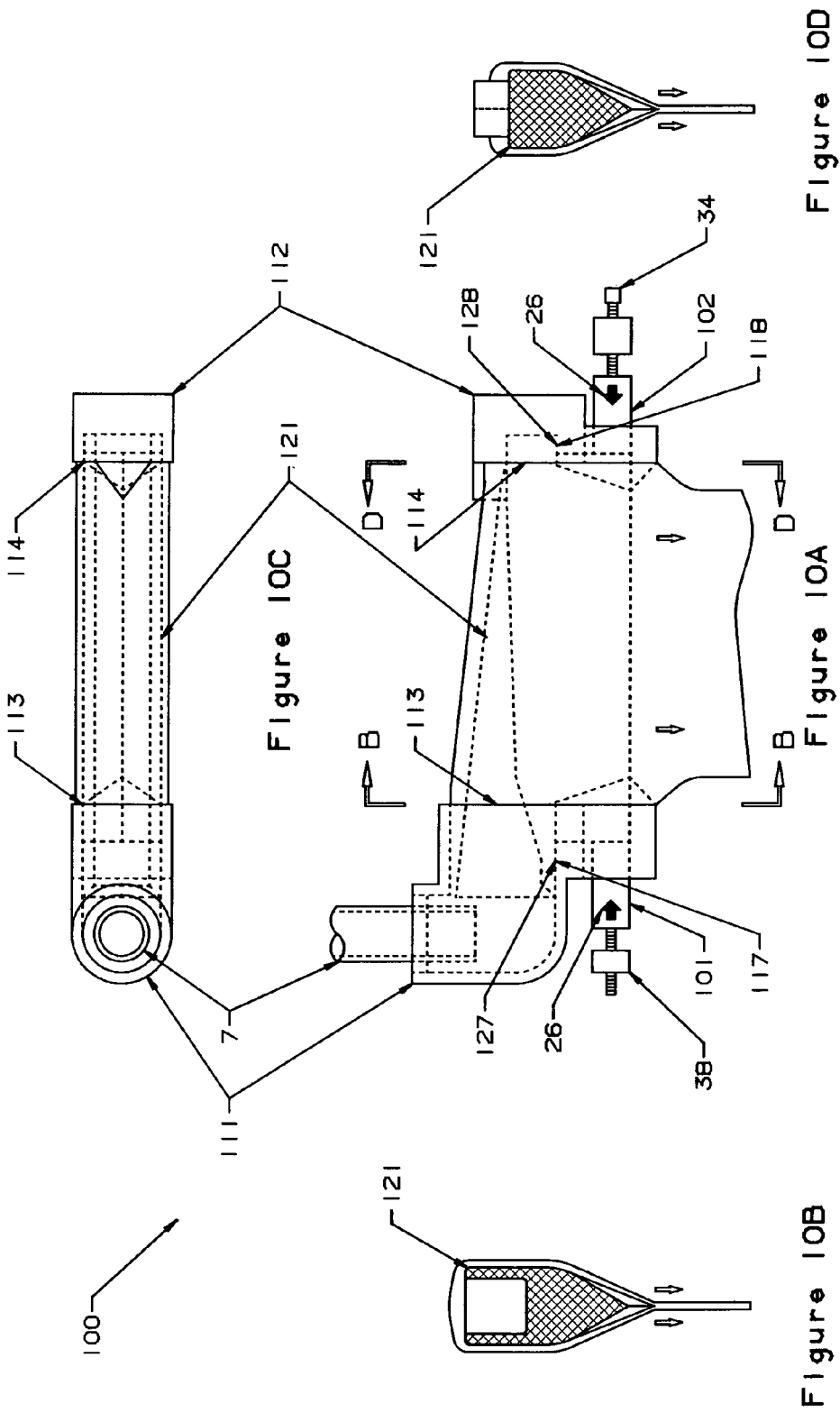

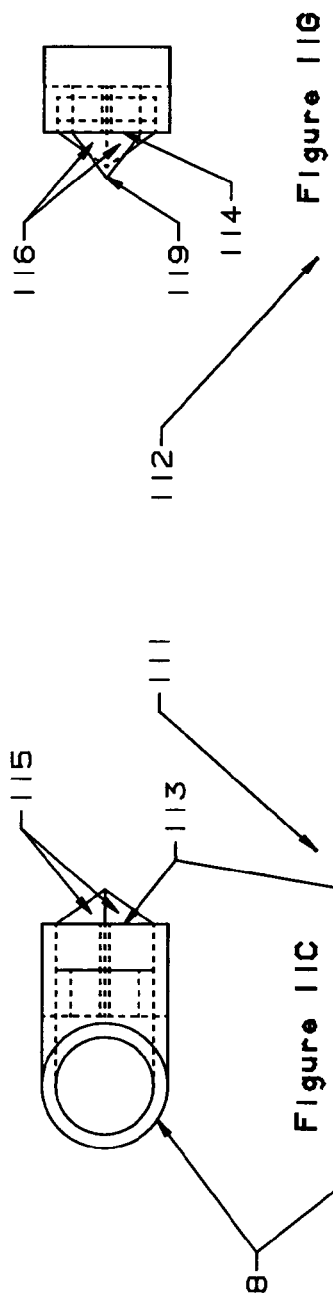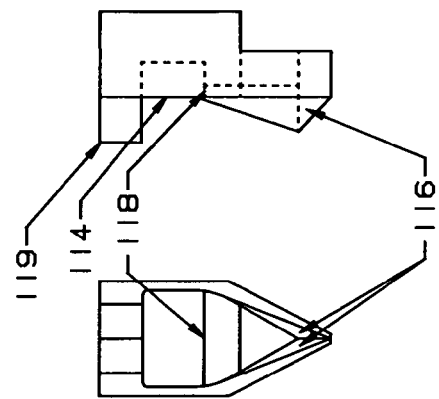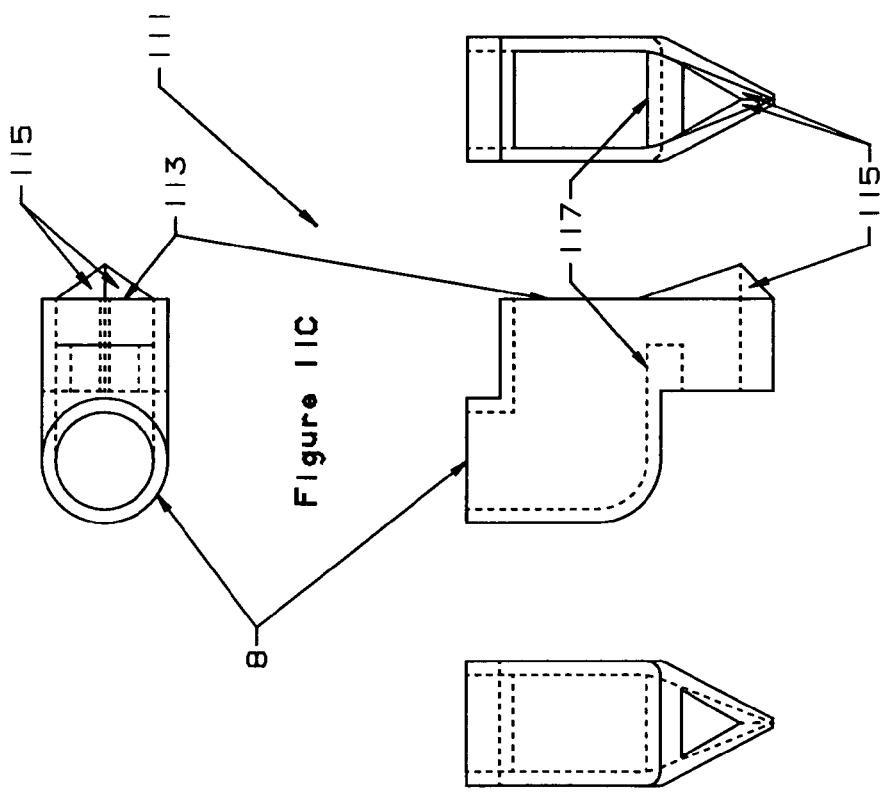
Figure 11H  Figure 11E  Figure 11F  Figure 11G  Figure 11D  Figure 11A  Figure 11B  Figure 11C

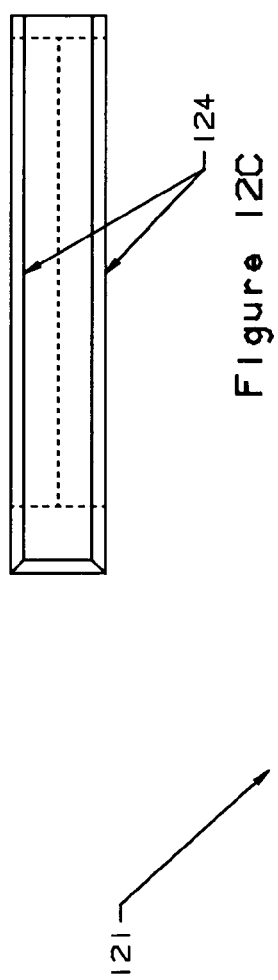
Figure 12C
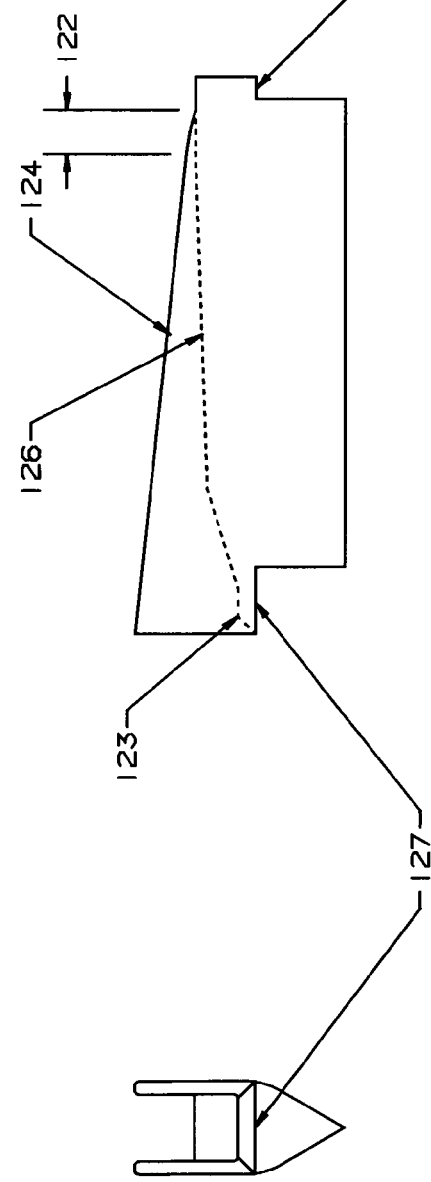
Figure 12A
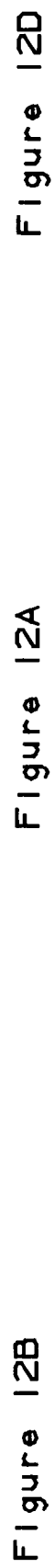
Figure 12D
Figure 12B

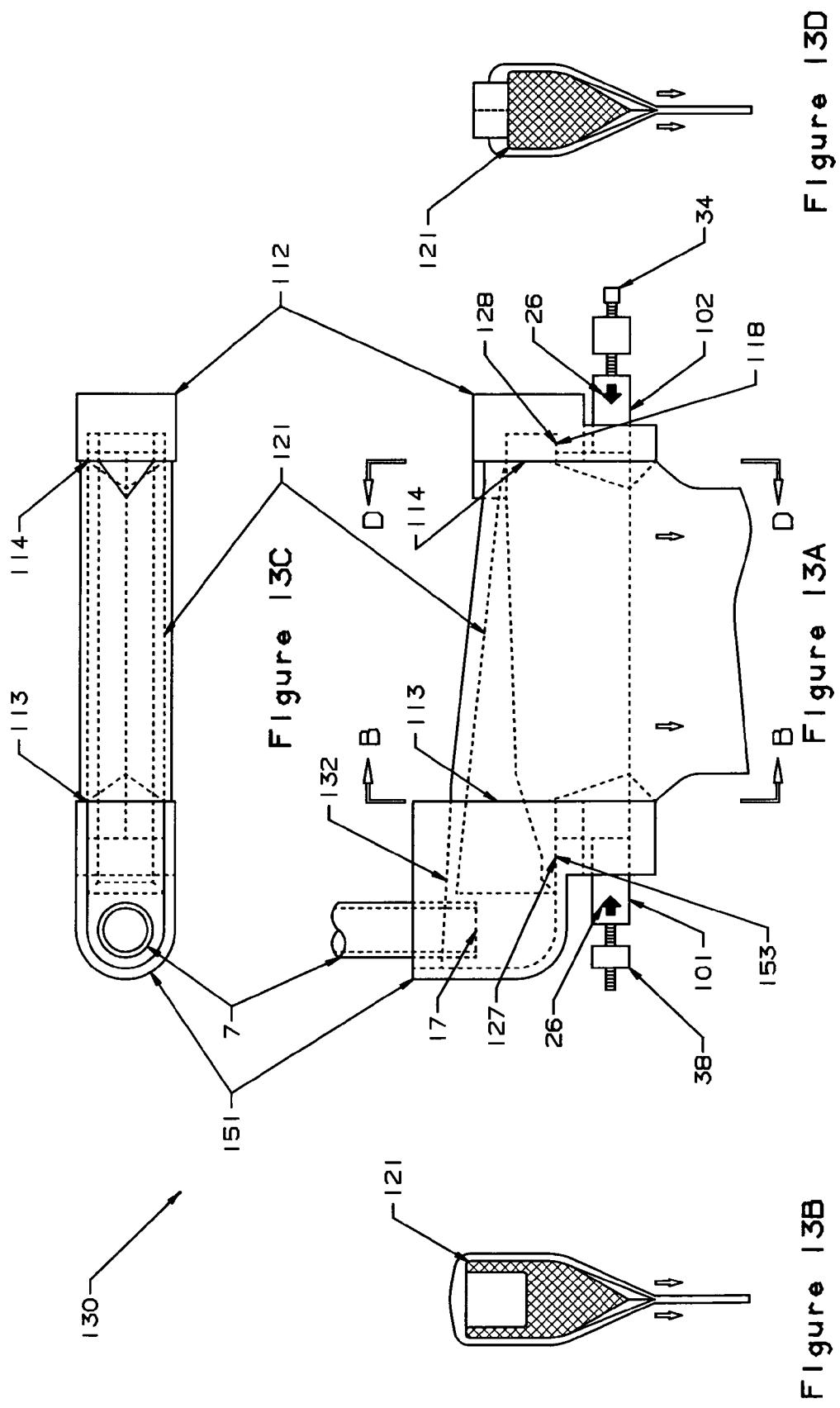

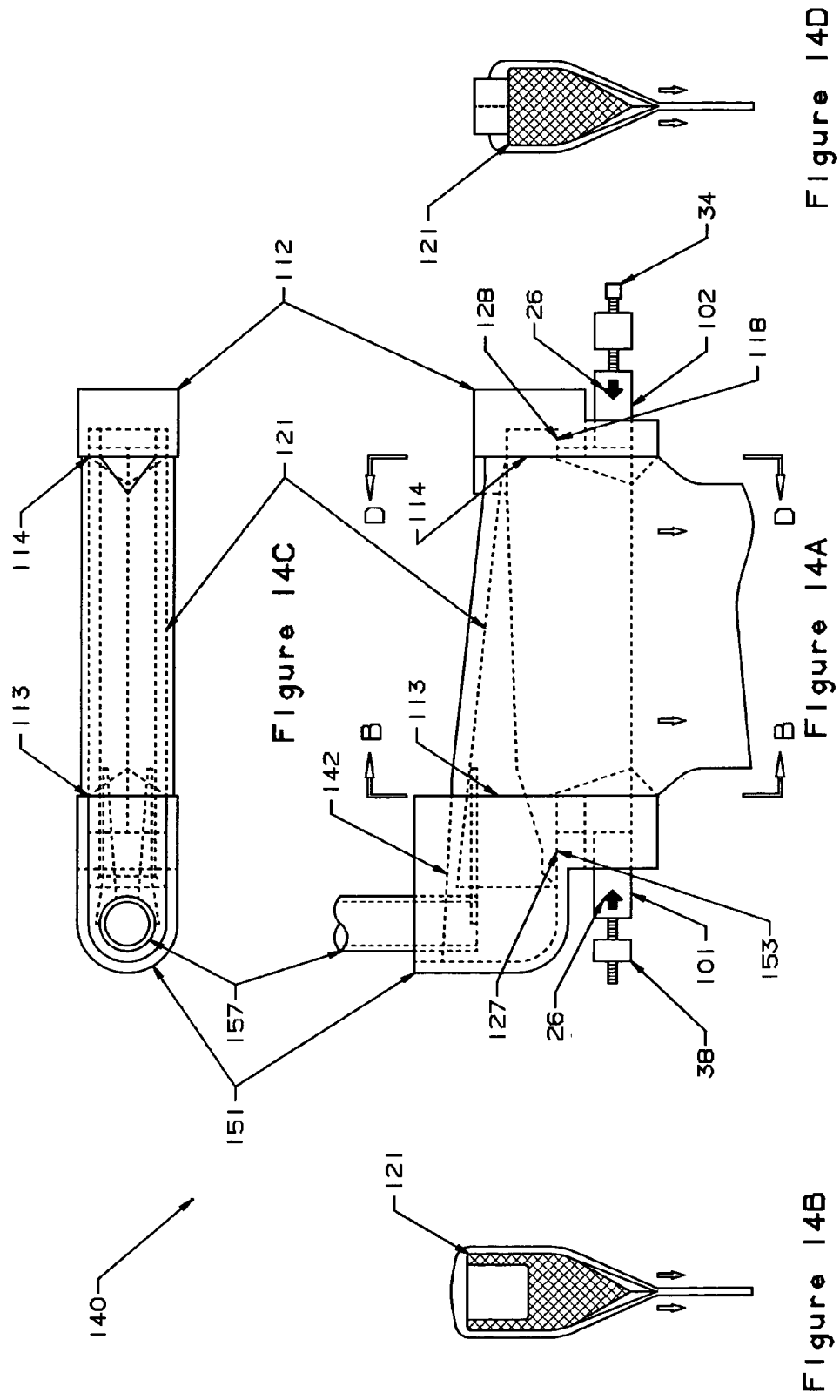

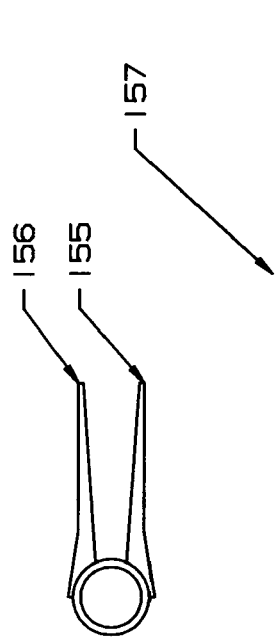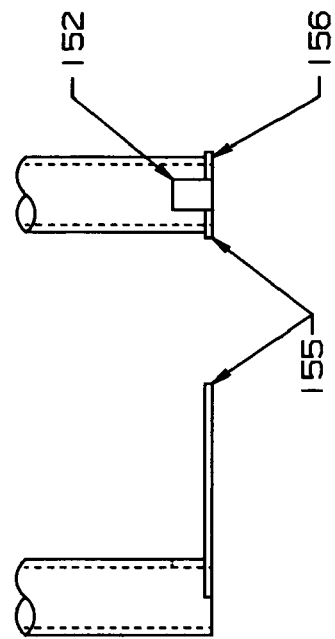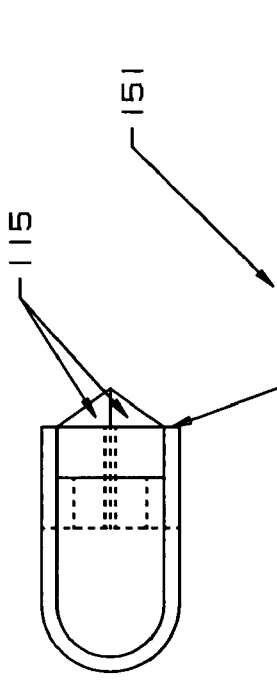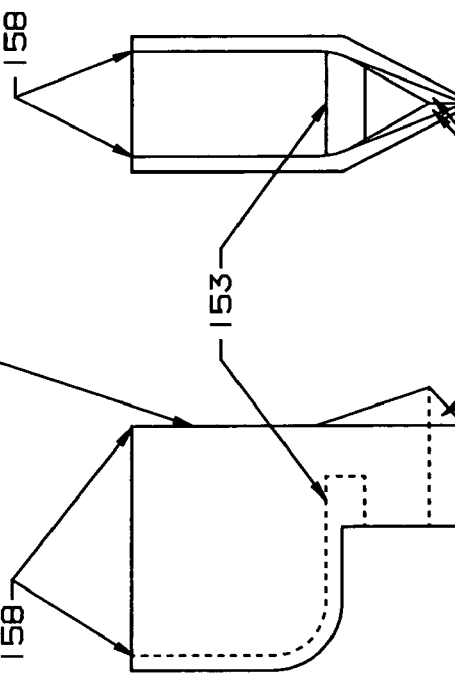
Figure 15A
Figure 15B
Figure 15C
Figure 15D
Figure 15E
Figure 15F

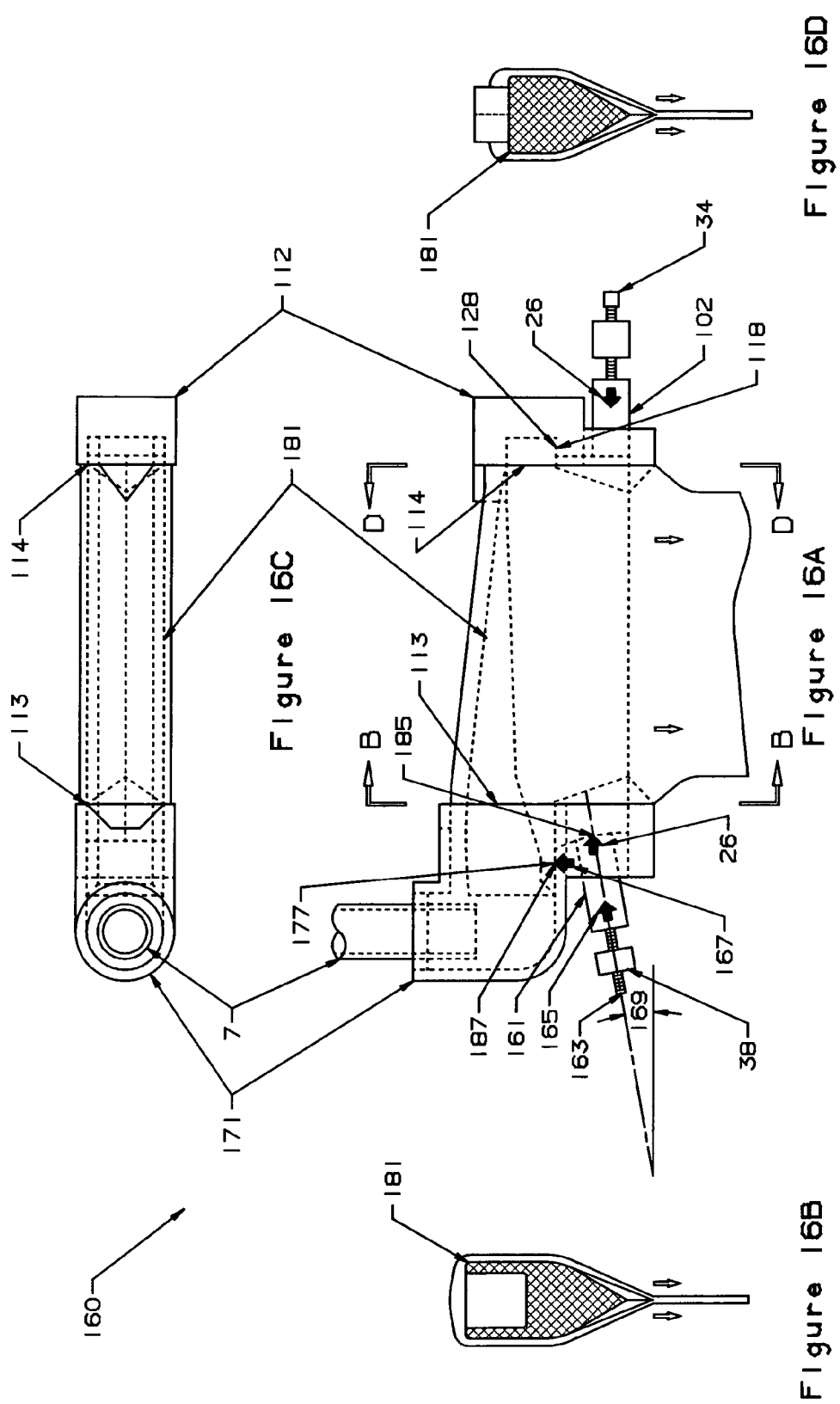

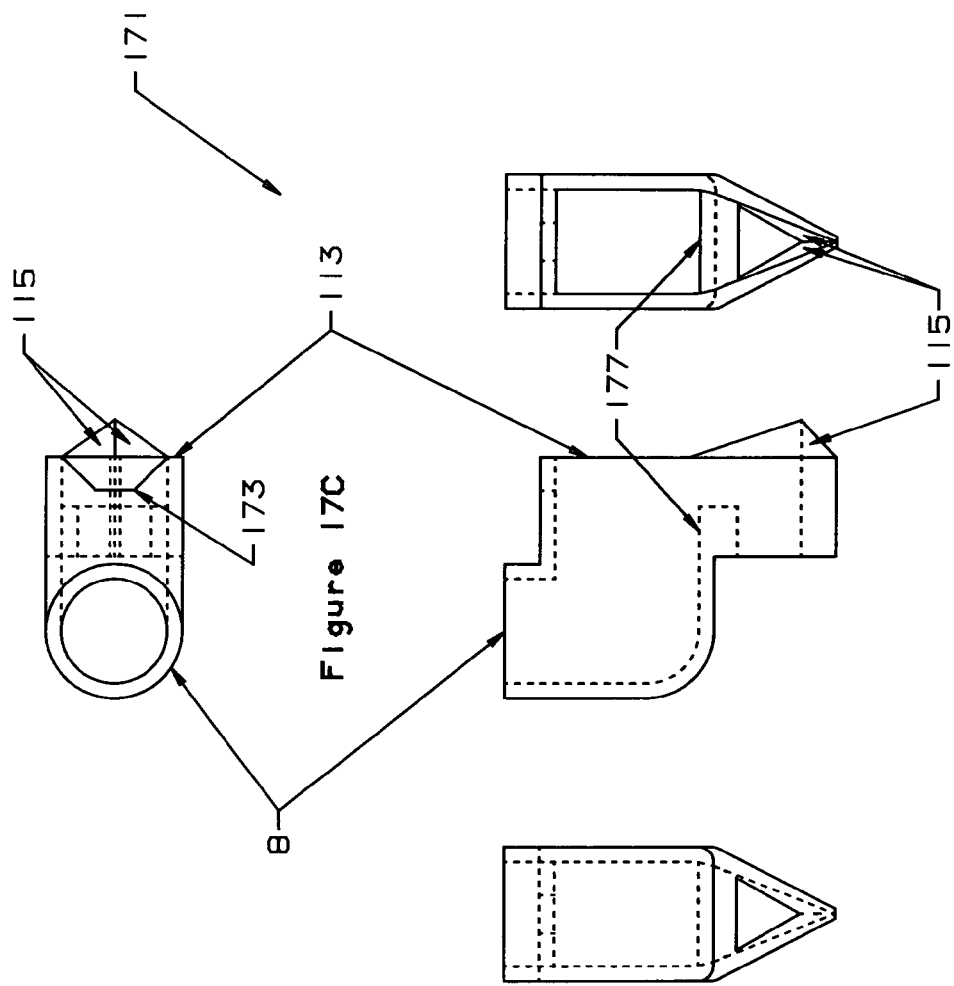

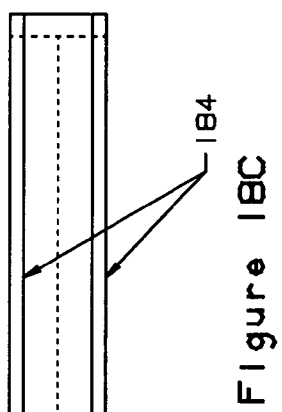
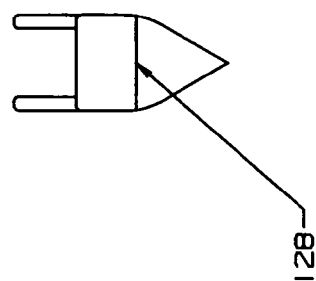
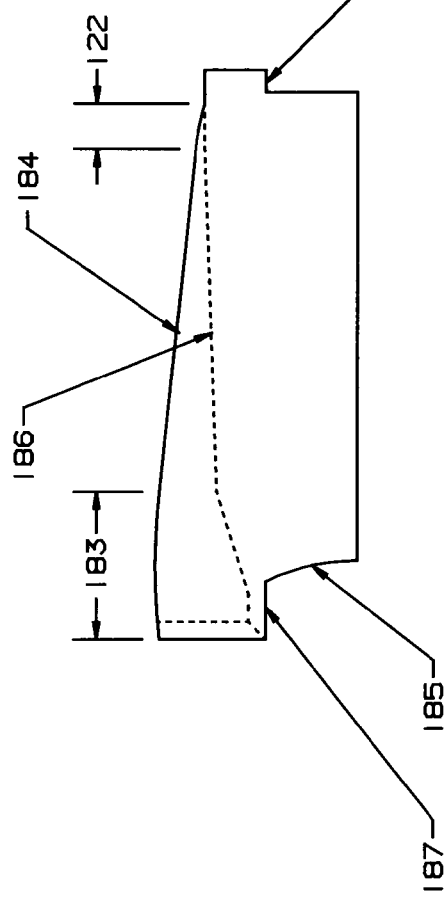
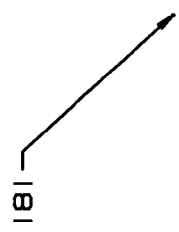
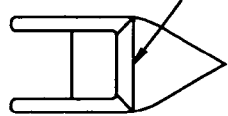
Figure 18D
Figure 18C
Figure 18A
Figure 18B

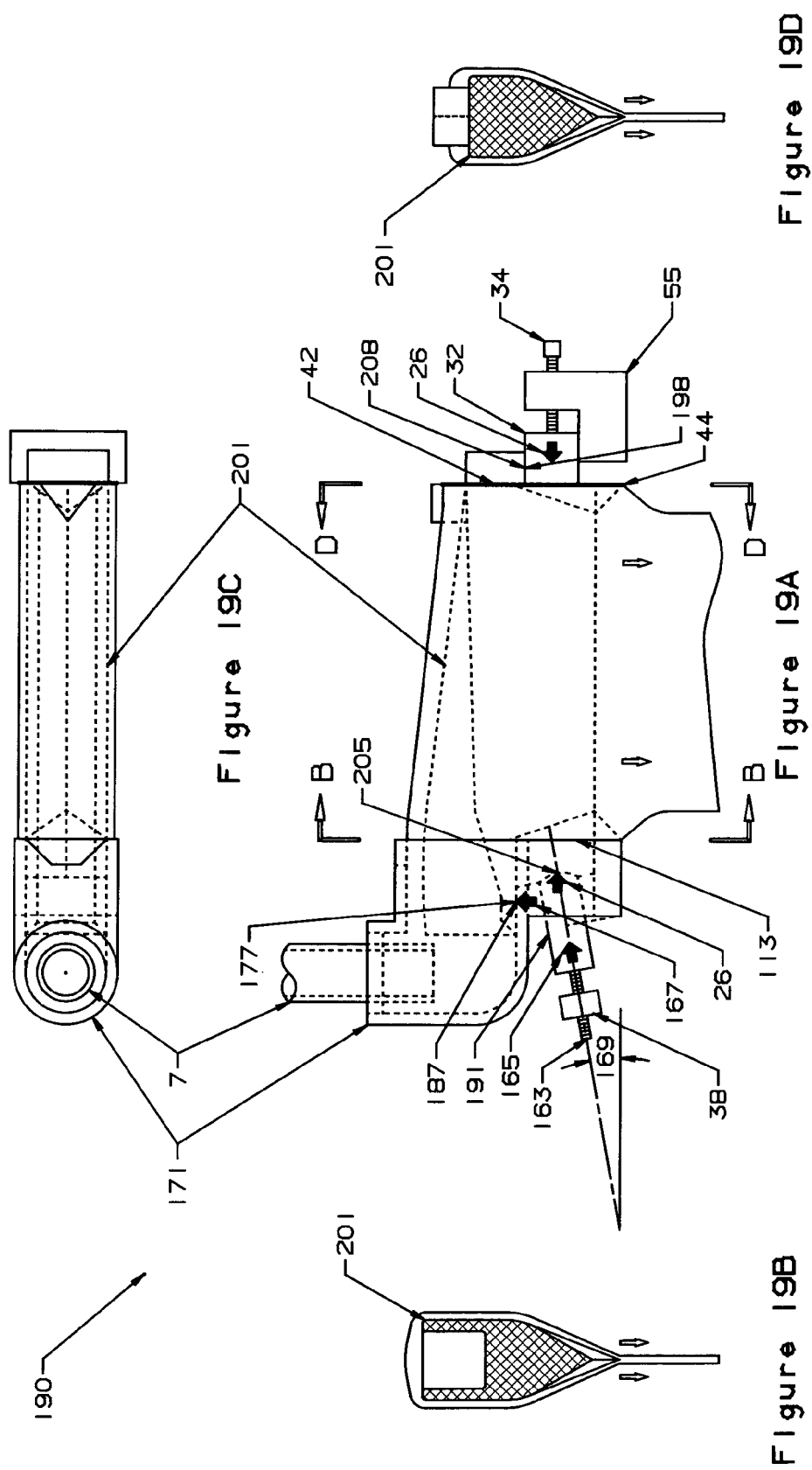

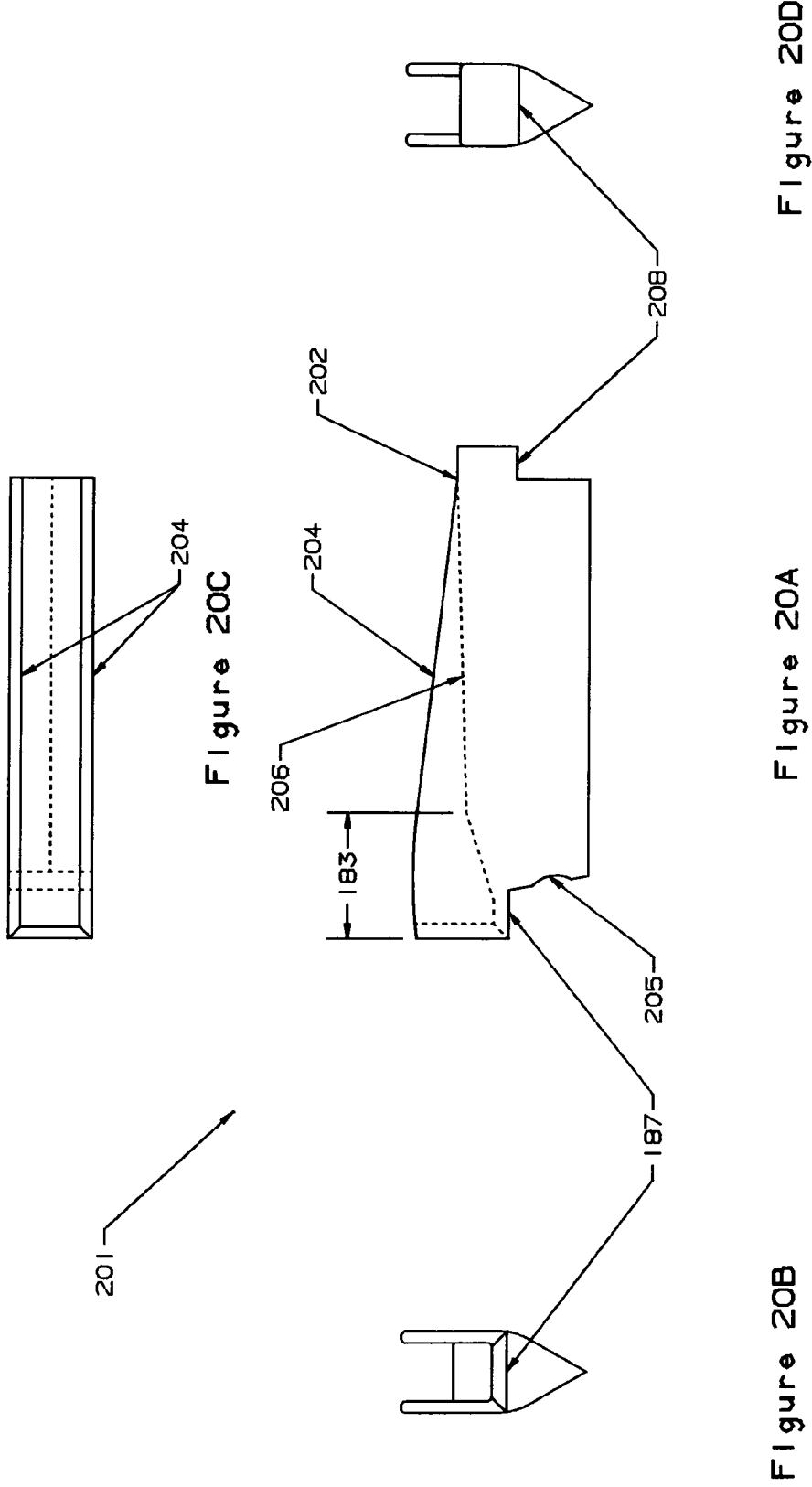

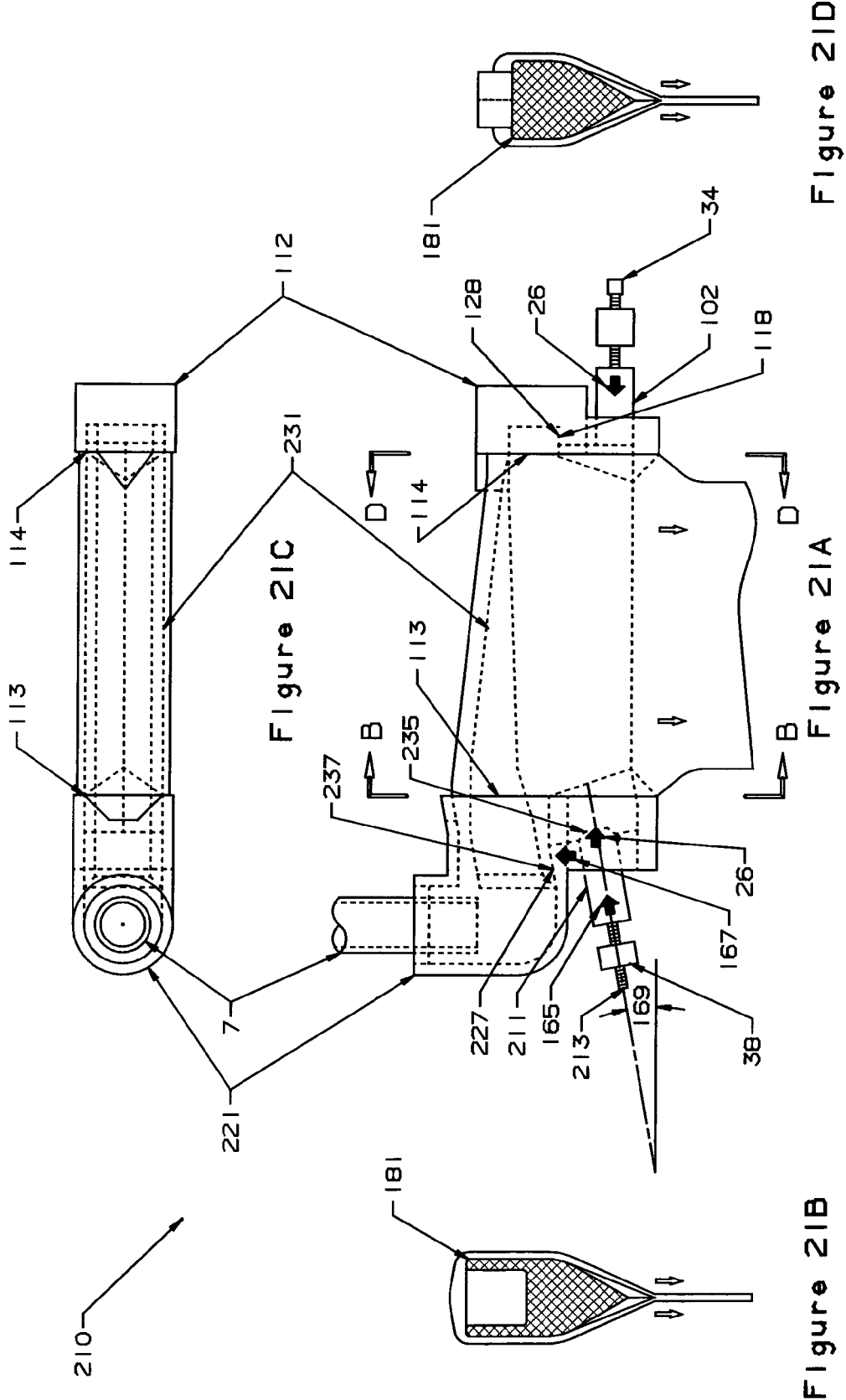

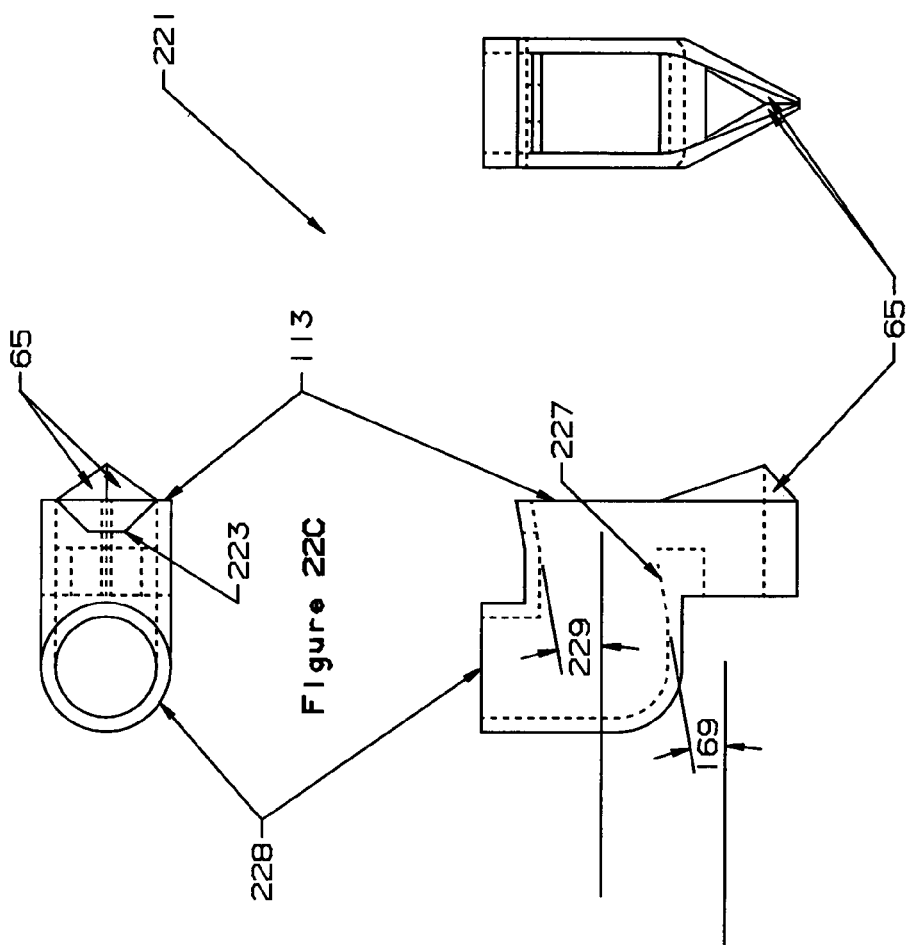
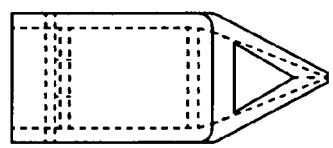
Figure 22A
Figure 22B
Figure 22C
Figure 22D

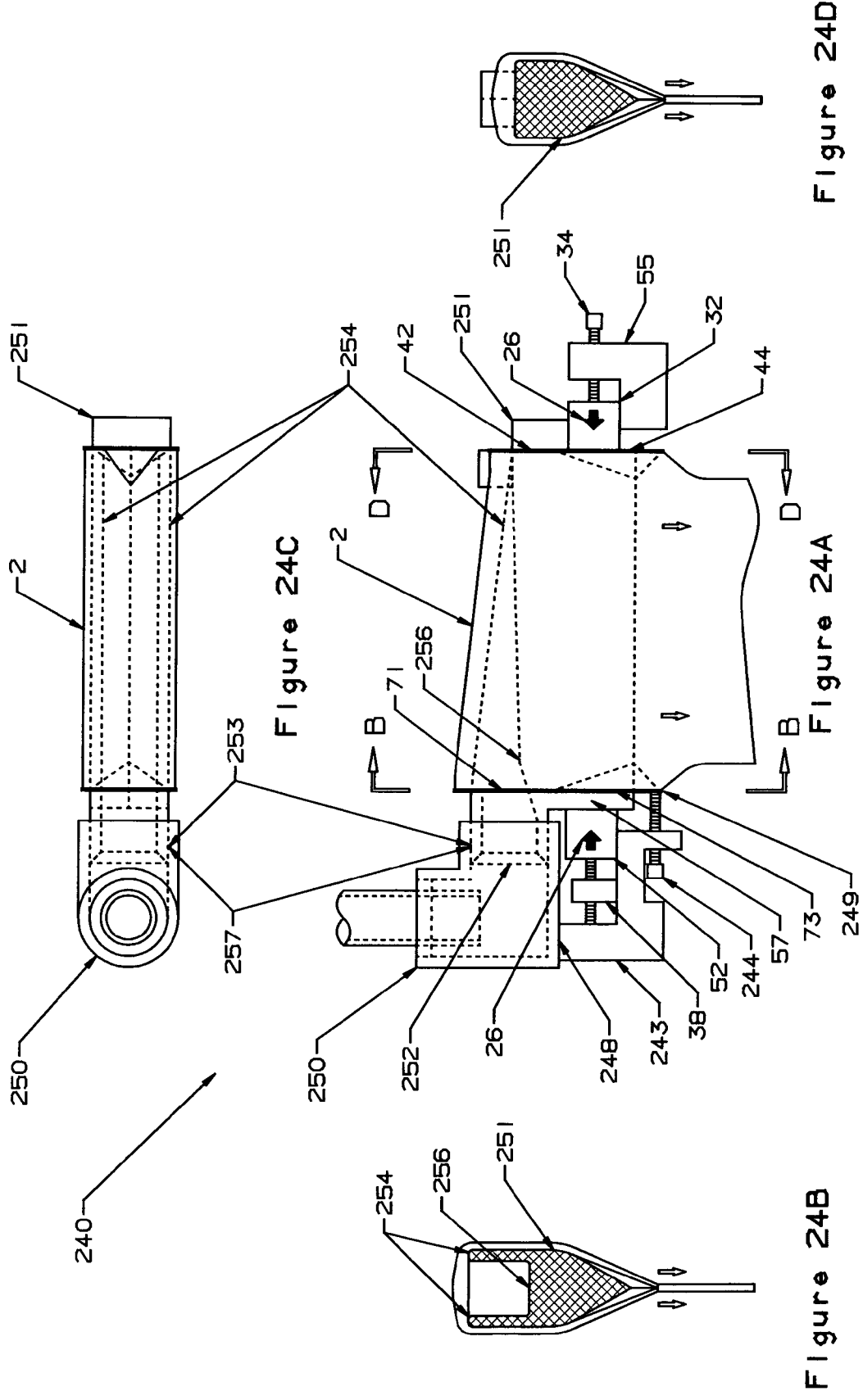

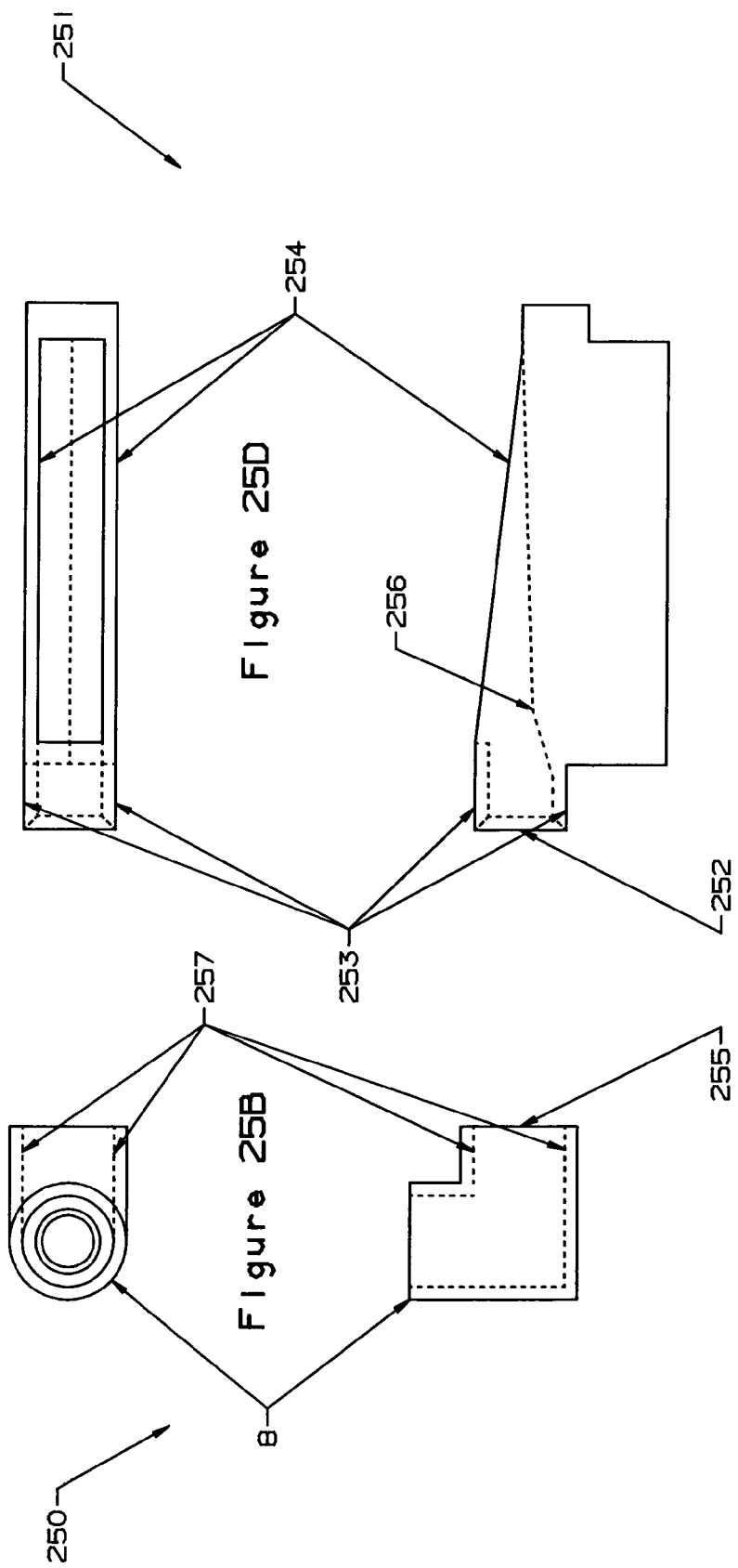

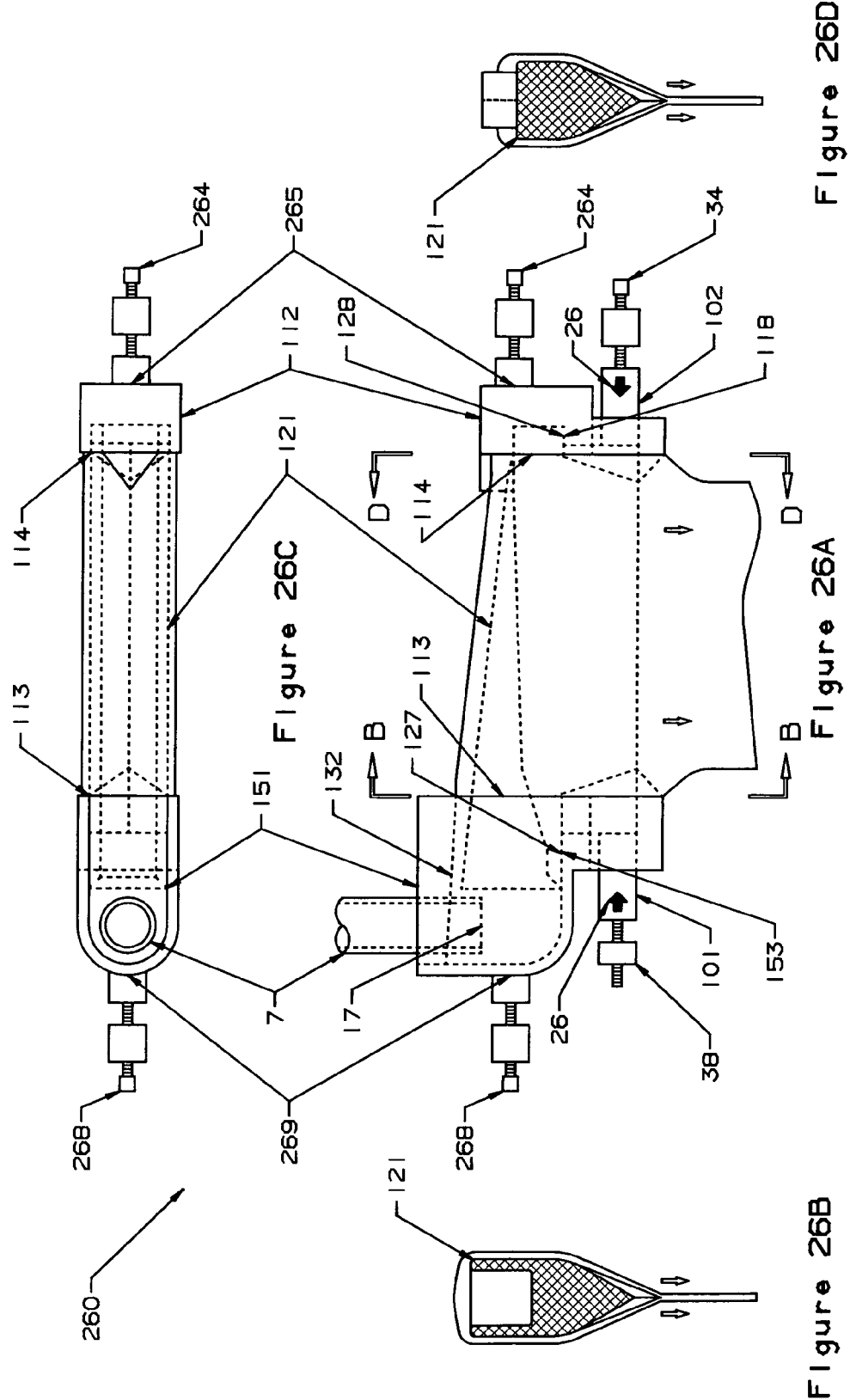

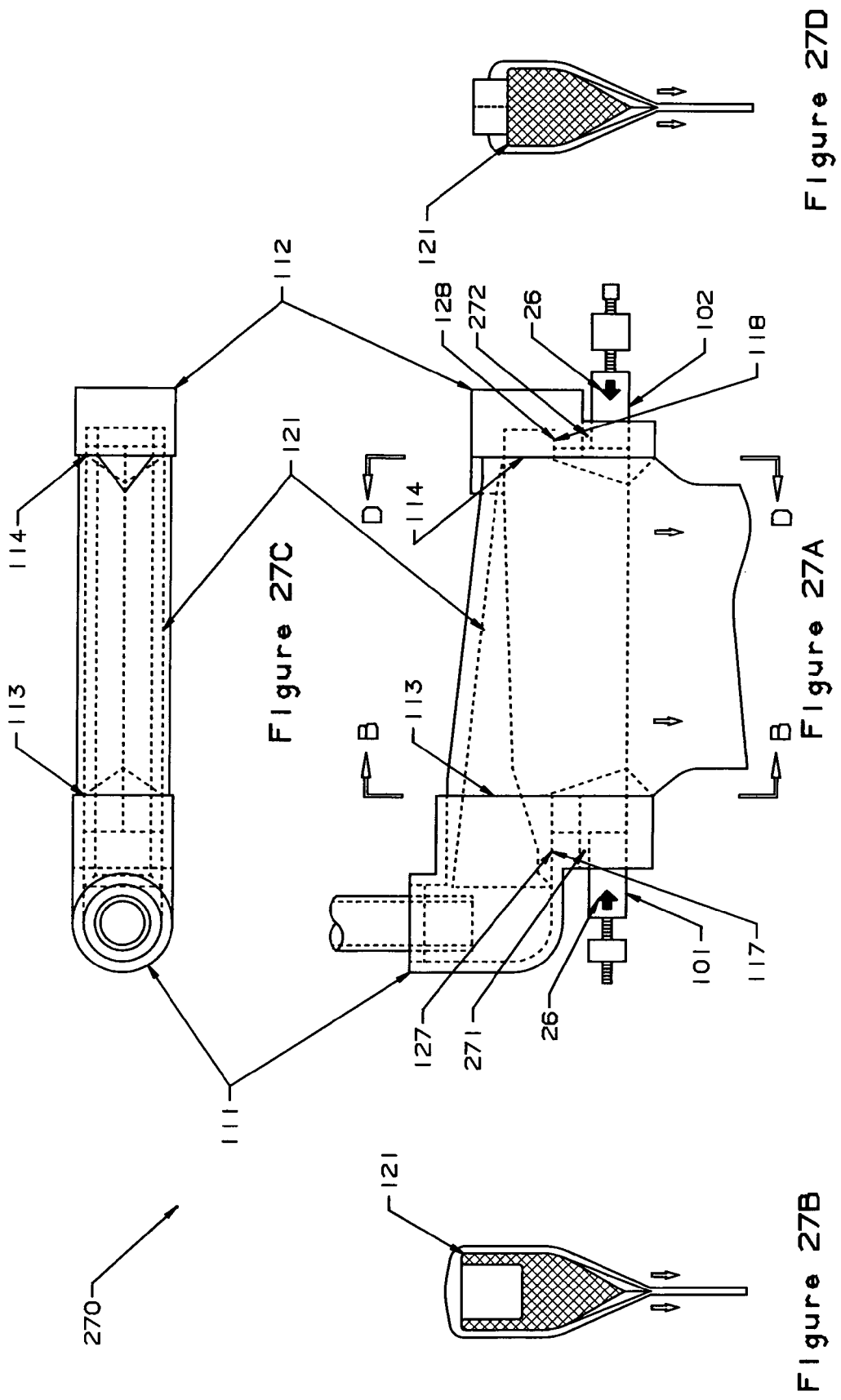

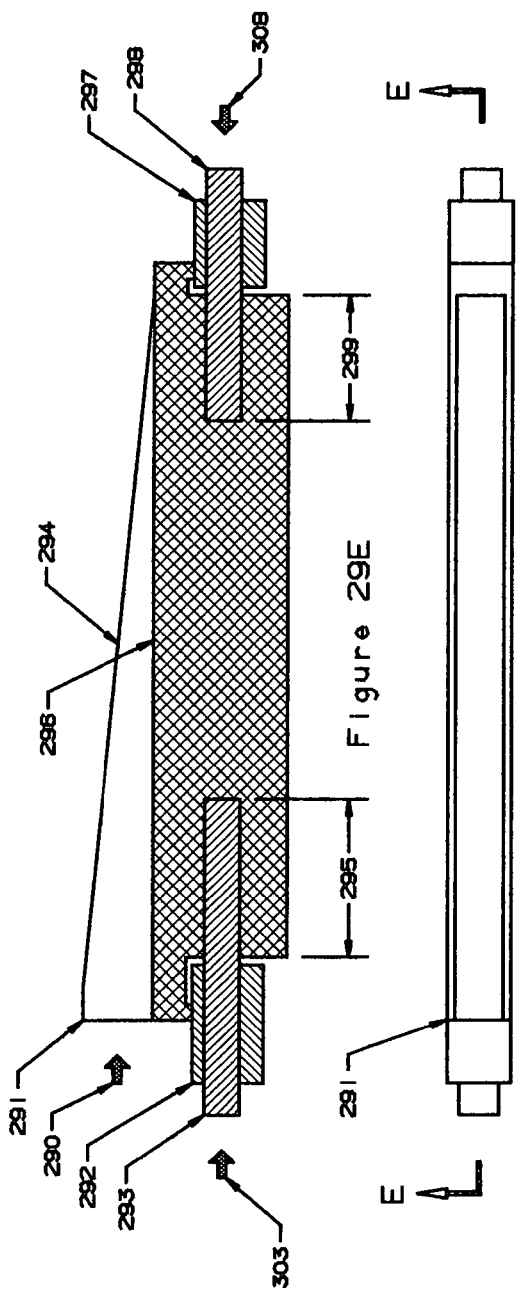
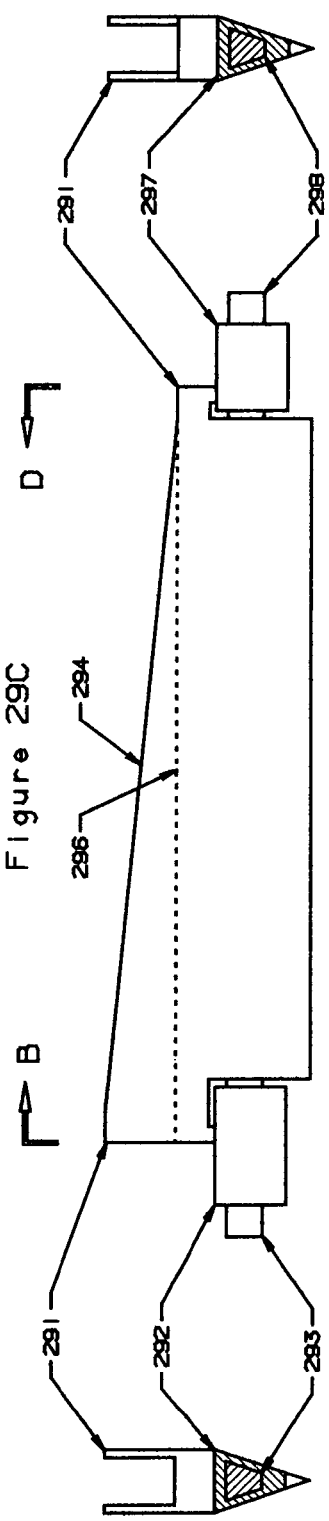
Figure 29E
Figure 29C
Figure 29A
Figure 29B
Figure 29D

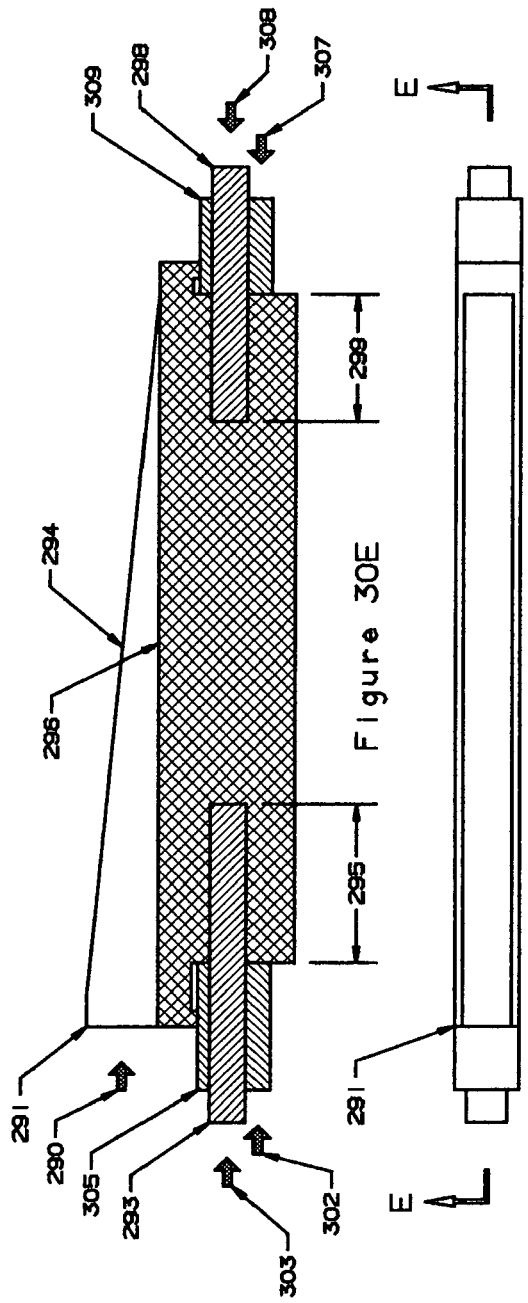
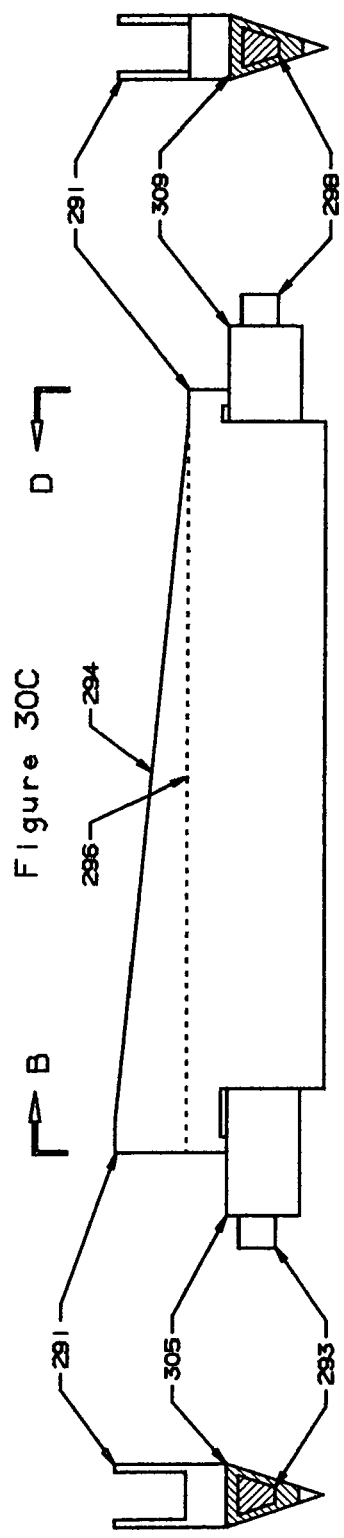

SHEET WIDTH CONTROL FOR OVERFLOW DOWNDRAW SHEET GLASS FORMING APPARATUS

REFERENCE TO RELATED APPLICATIONS

This application claims an invention, which was disclosed in the following Provisional Applications:

1) Provisional Application No. 60/546,875, filed Feb. 23, 2004, entitled "SHEET GLASS FORMING APPARATUS";
2) Provisional Application No. 60/576,274, filed Jun. 2, 2004, entitled "SHEET GLASS FORMING APPARATUS";
3) Provisional Application No. 60/599,620, filed Aug. 6, 2004, entitled "OVERFLOW DOWNDRAW SHEET GLASS FORMING METHOD AND APPARATUS"; and
4) Provisional Application No. 60/623,783, filed Oct. 29, 2004, entitled "OVERFLOW DOWNDRAW SHEET GLASS FORMING METHOD AND APPARATUS".

The benefit under 35 USC §119(e) of the United States provisional applications is hereby claimed, and the aforementioned applications are hereby incorporated herein by reference.

BACKGROUND OF THE INVENTION

1. Field of the Invention

This invention relates generally to the manufacture of glass sheet and, more particularly, to glass sheet used for the production of TFT/LCD display devices that are widely used for computer displays.

2. Description of Related Art

The glass that is used for semiconductor powered display applications must have very high surface quality to allow the successful application of semiconductor type material. Sheet glass made using the apparatus of U.S. Pat. No. 3,338,696 assigned to Coming, Inc. makes the highest quality glass as formed and does not require post-processing. The Coming patent makes glass by a manufacturing process termed "The Overflow Process". Glass made using other processes requires grinding and/or polishing and thus does not have as fine a surface finish. The glass sheet must also conform to stringent thickness variation and warp specifications.

FIGS. 1A through 1D illustrate the principle parts of a typical "Overflow Process" manufacturing system. The molten glass (2) from the melting furnace and forehearth, which must be of substantially uniform temperature and chemical composition, enters the forming apparatus from the downcomer pipe (7) at the downcomer pipe bottom end (17) into the inflow pipe (8) (also called an inlet pipe) and flows into the sheet forming block (1). The glass sheet forming apparatus, which is described in detail in U.S. Pat. Nos. 3,338,696 and 6,748,765 and in the patent application Ser. No. 10/214,904, includes a shallow trough on the top of a wedge shaped forming block (1). Straight sloped weirs (4) substantially parallel with the pointed edge of the wedge, herein termed the root (5), form each side of the trough in the forming block (1).

The trough bottom (6) and the sides of the trough are contoured in a manner to provide even distribution of the glass (2) to the top of each side weir (4). The molten glass (2) then flows through the trough, over the top of each side weir (4), down each side of the wedge shaped sheet forming block (1), and joins at the root (5) to form a sheet of molten glass. The molten glass is then cooled as it is pulled off the root (5) to form a solid glass sheet (10) of substantially uniform thickness.

The refractory materials from which the forming block and its support structure are made have high strength in compression and low strength in tension. Like most structural materials they also change shape when stressed at high temperature by a process termed thermal creep.

FIGS. 2A through 2D illustrate the typical effects of thermal creep on the shape of the forming block when the end support and compression blocks impart different compression stress to the bottom of the forming block (1) near the root (5). FIG. 2A shows that with no compression loading the forming block (1) sags in the middle such that the top of the weirs (4) and the root (5) are now curved (21) and the trough bottom (6) has a change in curvature (21). This curvature (21) causes the molten glass (2) to no longer flow with constant thickness (22) over the weirs (4). More specifically, the curvature (21) allows more glass to flow over the middle of the weirs resulting in an uneven sheet thickness distribution. The forming block (1) has an initial length (20) as defined by the phantom lines (24) and (29). With no external loading the weirs (4) get shorter and the root (5) gets longer.

FIG. 2B shows that sagging of the forming block is minimized under the optimum compression loading (26) of the lower section of the forming block (1) near the root (5). With optimal loading both the weirs (4) and the root (5) shorten equally to length (27). FIG. 2C shows that if too much load (25) is applied to the lower section of the trough (1) near the root (5), the root (5) is compressed excessively, thus producing a convex shape (23) to the trough weirs (4), the trough bottom (6), and the root (5). The root (5) shortens considerably more than the weirs (4) as can be seen by the movement relative to the phantom lines (24) and (29). FIGS. 2A through 2C represent the effect of thermal creep over the same time period. FIG. 2D shows a forming block (1), which has shortened a greater amount to length (28). This increased shortening is caused by imparting the correct load (26) for the increased time of a substantially longer production campaign. This increased shortening has an adverse effect on the width of the manufactured sheet.

The application of the optimum compression loading (26) minimizes the sagging of the forming block (1), but it does not maintain an optimum shape of the forming block. The flow distribution of the glass flowing in the forming block (1) is greatly improved, however, there is still a measurable amount of distortion of the forming block (1). FIG. 28 shows a typical forming block (281) magnified relative to its original shape (1), when acted upon by the optimum compression load (26). The forming block weirs (284) and trough bottom (286) have a slightly distorted curved shape.

U.S. Pat. No. 3,451,798 teaches that a sheet glass edge control device, termed "edge director" herein, must be installed at each end of the trough to prevent narrowing of the formed sheet as a result of surface tension. FIG. 3A through 3D show the prior art edge director assemblies (41) and (42), shown in FIGS. 4A through 4F, attached to the ends of the trough forming block (1). The flanges (47) of the inflow edge director assembly (41) are compressed against the forming block (1) by the inflow support and compression block (31). The inflow support and compression block (31) rests on the inflow end support structure (33) and is held in position by the adjustment device (34). The flanges (48) of the far end edge director assembly (42) are compressed against the forming block (1) by the far end support and compression block (32). The far end support and compression block (32) rests on the far end structure (35) and is held in position by the force motor (38). A force motor (38) is a device that generates a substantially constant linear force and may be physically implemented as either an air cylinder, a hydraulic cylinder, a spring assembly, an electric motor, or a weight and lever system.

As illustrated, the glass attaches to the fences (43) and (44) of the edge director assemblies (41) and (42) and maintains the same width as it flows down the sides of the forming block (1) from the weirs (4) to the root (5). The glass narrows under the influence of surface tension only as it leaves the bottom of the fences (43) and (44). The force motor (38) applies the compression force (36) to the forming block (1), which is restrained at the inflow end by the adjustment device (34). Over time thermal creep caused by the applied load (36) forces the edge director assemblies (41) and (42) to move closer to each other, thus producing a narrower sheet.

FIGS. 4A through 4C are side, end, and top views of the inflow end edge director (41) as used in the prior art. The inflow end edge director (41) has a fence (43) to which the glass attaches such that the width is maintained. The edge director (41) also has symmetrical edge director surfaces (45) that provide for gravity to assist the flowing glass to attach to the fence and flanges (47) that are used to secure the edge director to the inflow end of the forming block (1).

FIGS. 4D through 4F are side, end, and top views of the far end edge director (42) as used in the prior art. The far end edge director (42) has a fence (44) to which the glass attaches such that the width is maintained. The edge director (42) also has symmetrical edge director surfaces (46) that provide for gravity to assist the flowing glass to attach to the fence and flanges (48) that are used to secure the edge director to the far end of the forming block (1). Attached to the outlet edge director (42) is a wedge shaped protrusion, herein termed a plow (49), which aids in the control of the glass flow over the weirs (4) near the far end edge director (42).

The edge directors are normally fabricated via welding from platinum or platinum alloy sheet (platinum herein). In the prior art, the edge directors are fixed to each end of the forming block. Thus, as the campaign progresses and the forming block becomes shorter via thermal creep, the manufactured sheet becomes narrower. This results in less square feet of production and required process adjustments.

A major drawback of the apparatus of "The Overflow Process" is that the forming apparatus deforms during the manufacturing campaign in a manner such that the glass sheet no longer meets the width specification. This is a cause for premature termination of the production run.

Another major drawback of the apparatus of "The Overflow Process" is that there is no means for adjusting the width of the sheet which is manufactured.

Another major drawback is that although the compression loading of the bottom ends of the forming block corrects for the major portion of the forming block sag caused by thermal creep, this compression loading does introduce a measure of distortion of the forming block weirs and trough bottom.

Therefore, there is a need in the art for an apparatus, which maintains a constant glass width, and is capable of adjusting the width of the sheet. There is also a need in the art for an apparatus, which has additional means to control the shape of the forming block weirs and trough bottom when the forming block deforms due to thermal creep.

SUMMARY OF THE INVENTION

The present invention is a significant modification of "The Overflow Process" that embodies design features that provide for control over the width of the manufactured glass sheet.

This invention introduces a method to keep the width of the manufactured sheet substantially the same by attaching edge directors for the formed sheet to the manufacturing apparatus structure instead of to the forming block. Thus, sheet glass may be manufactured to specification for a longer time with the same forming block.

This invention additionally introduces a method that allows the construction of the forming block from molybdenum, a material less prone to thermal creep than the refractory zircon. Thus, the life of the forming block is extended.

This invention additionally introduces a method to adjust the width of the manufactured sheet by changing the distance between the edge directors. Thus sheet glass may be manufactured to different width specifications with the same forming block.

This invention additionally introduces a method to further minimize the distortion of the forming block trough and weirs when the forming block changes shape under the influence of thermal creep.

BRIEF DESCRIPTION OF THE DRAWINGS

FIG. 1A is a side view of the prior art overflow downdraw sheet glass forming apparatus.

FIG. 1B is a cross-section of the forming block shown in FIG. 1A across lines B-B.

FIG. 1C is a top view of the prior art overflow downdraw sheet glass forming apparatus.

FIG. 1D is a cross-section of the forming block shown in FIG. 1A across lines D-D.

FIG. 2A is an illustration of the thermal creep deformation of the glass forming block under the load of its own weight.

FIG. 2B is an illustration of the thermal creep deformation of the glass forming block under an applied load that minimizes vertical deformation.

FIG. 2C is an illustration of the thermal creep deformation of the glass forming block under excessive applied load.

FIG. 2D is an illustration of the thermal creep deformation of the glass forming block under an applied load that minimizes vertical deformation over the extended period of a production campaign.

FIG. 3A is a side view of the prior art overflow downdraw sheet glass forming apparatus showing the edge directors, the support and compression blocks, and the end support structures for both the inflow end and the far end of the forming block.

FIG. 3B is a cross-section of the forming block shown in FIG. 3A across lines B-B.

FIG. 3C is a partial top view of the prior art overflow downdraw sheet glass forming apparatus shown in FIG. 3A.

FIG. 3D is a cross-section of the forming block shown in FIG. 3A across lines D-D.

FIG. 4A is a side view of the prior art inflow end edge director.

FIG. 4B is an end view of the prior art inflow end edge director.

FIG. 4C is a top view of the prior art inflow end edge director.

FIG. 4D is a side view of the prior art far end edge director.

FIG. 4E is an end view of the prior art far end edge director.

FIG. 4F is a top view of the prior art far end edge director.

FIG. 5A is a side view of an embodiment of the present invention schematically illustrating the components and assembly for a forming apparatus which provides for a change in position of the forming block relative to the inflow end edge director.

FIG. 5B is a cross-section of the forming block shown in FIG. 5A across lines B-B.

FIG. 5C is a partial top view of the embodiment of this invention shown in FIG. 5A.

FIG. 5D is a cross-section of the forming block shown in FIG. 5A across lines D-D.

FIG. 6A is a side view of an embodiment of the present invention schematically illustrating the components and assembly for a forming apparatus which provides for a change in position of the forming block relative to the far end edge director.

FIG. 6B is a cross-section of the forming block shown in FIG. 6A across lines B-B.

FIG. 6C is a partial top view of the embodiment of this invention shown in FIG. 6A.

FIG. 6D is a cross-section of the forming block shown in FIG. 6A across lines D-D.

FIG. 8A is a side view of an embodiment of the present invention schematically illustrating the components and assembly for a forming apparatus which provides for a change in position of the forming block relative to the inflow end edge director.

FIG. 8B is a cross-section of the forming block shown in FIG. 8A across lines B-B.

FIG. 8C is a partial top view of the embodiment of this invention shown in FIG. 8A.

FIG. 8D is a cross-section of the forming block shown in FIG. 8A across lines D-D.

FIG. 9A is a side view of an embodiment of the present invention schematically illustrating the components and assembly for a forming apparatus which provides for a change in position of the forming block relative to both the inflow end edge director and the far end edge director.

FIG. 9B is a cross-section of the forming block shown in FIG. 9A across lines B-B.

FIG. 9C is a partial top view of the embodiment of this invention shown in FIG. 9A.

FIG. 9D is a cross-section of the forming block shown in FIG. 9A across lines D-D.

FIG. 10A is a side view of an embodiment of the present invention schematically illustrating the components and assembly for a forming apparatus which provides for a change in position of the forming block relative to both the inflow end edge director and the far end edge director.

FIG. 10B is a cross-section of the forming block shown in FIG. 10A across lines B-B.

FIG. 10C is a partial top view of the embodiment of this invention shown in FIG. 10A.

FIG. 10D is a cross-section of the forming block shown in FIG. 10A across lines D-D.

FIG. 11A is a side view of the inflow end support assembly for the embodiment of the invention shown in FIGS. 10A through 10D.

FIG. 11B is an end view of the inflow end support assembly in FIG. 11A.

FIG. 11C is a top view of the inflow end support assembly in FIG. 11A.

FIG. 11D is an end view of the inflow end support assembly in FIG. 11A.

FIG. 11E is a side view of the far end support assembly for the embodiment of the invention shown in FIGS. 10A through 10D, FIGS. 13A through 13D, FIGS. 16A through 16D, and FIGS. 21A through 21D.

FIG. 11F is an end view of the far end support assembly in FIG. 11E.

FIG. 11G is a top view of the far end support assembly in FIG. 11E.

FIG. 11H is an end view of the far end support assembly in FIG. 11E.

FIG. 12A is a side view of the forming block in the embodiment of the invention shown in FIGS. 10A through 10D, FIGS. 13A through 13D, and FIGS. 14A through 14D.

FIG. 12B is an end view of the forming block shown in FIG. 12A.

FIG. 12C is a top view of the forming block shown in FIG. 12A.

FIG. 12D is an end view of the forming block shown in FIG. 12A.

FIG. 13A is a side view of an embodiment of the present invention schematically illustrating the components and assembly for a forming apparatus which provides for a change in position of the forming block relative to both the inflow end edge director and the far end edge director.

FIG. 13B is a cross-section of the forming block shown in FIG. 13A across lines B-B.

FIG. 13C is a partial top view of the embodiment of this invention shown in FIG. 13A.

FIG. 13D is a cross-section of the forming block shown in FIG. 13A across lines D-D.

FIG. 14A is a side view of an embodiment of the present invention schematically illustrating the components and assembly for a forming apparatus which provides for a change in position of the forming block relative to both the inflow end edge director and the far end edge director.

FIG. 14B is a cross-section of the forming block shown in FIG. 14A across lines B-B.

FIG. 14C is a partial top view of the embodiment of this invention shown in FIG. 14A.

FIG. 14D is a cross-section of the forming block shown in FIG. 14A across lines D-D.

FIG. 15A is a side view of the trough shaped inflow end support assembly for the embodiment of the invention shown in FIGS. 13A through 13D and FIGS. 14A through 14D.

FIG. 15B is an end view of the inflow end support assembly shown in FIG. 15A.

FIG. 15C is a top view of the inflow end support assembly shown in FIG. 15A.

FIG. 15D is a side view of the special shape downcomer pipe for the embodiment of the invention shown in FIGS. 14A through 14D.

FIG. 15E is an end view of the downcomer pipe shown in FIG. 15D.

FIG. 15F is a top view of the downcomer pipe shown in FIG. 15D.

FIG. 16A is the side view of an embodiment of the present invention illustrating the components and assembly for a forming block support system which provides for lower friction forces affecting the forming block compression and provides for a change in position of the forming block relative to both the inflow end edge director and the far end edge director.

FIG. 16B is a cross-section of the forming block shown in FIG. 16A across lines B-B.

FIG. 16C is a partial top view of the embodiment of this invention shown in FIG. 16A.

FIG. 16D is a cross-section of the forming block shown in FIG. 16A across lines D-D.

FIG. 17A is a side view of the inflow end support assembly for the embodiment of the invention shown in FIGS. 16A through 16D and FIGS. 19A through 19D.

FIG. 17B is an end view of the inflow end support assembly in FIG. 17A.

FIG. 17C is a top view of the inflow end support assembly in FIG. 17A.

FIG. 17D is an end view of the inflow end support assembly in FIG. 17A.

FIG. 18A is a side view of the forming block in the embodiment of the invention shown in FIGS. 16A through 16D.

FIG. 18B is an end view of the forming block shown in FIG. 18A.

FIG. 18C is a top view of the forming block shown in FIG. 18A.

FIG. 18D is an end view of the forming block shown in FIG. 18A.

FIG. 19A is the side view of an embodiment of the present invention illustrating the components and assembly for a forming block support system which provides for lower friction forces affecting the forming block compression and provides for a change in position of the forming block relative to the inflow end edge director.

FIG. 19B is a cross-section of the forming block shown in FIG. 19A across lines B-B.

FIG. 19C is a partial top view of the embodiment of this invention shown in FIG. 19A.

FIG. 19D is a cross-section of the forming block shown in FIG. 19A across lines D-D.

FIG. 20A is a side view of the forming block in the embodiment of the invention shown in FIGS. 19A through 19D.

FIG. 20B is an end view of the forming block shown in FIG. 20A.

FIG. 20C is a top view of the forming block shown in FIG. 20A.

FIG. 20D is an end view of the forming block shown in FIG. 20A.

FIG. 21A is the side view of an embodiment of the present invention illustrating the components and assembly for a forming block support system which provides for lower friction forces affecting the forming block compression and provides for a change in position of the forming block relative to both the inflow end edge director and the far end edge director.

FIG. 21B is a cross-section of the forming block shown in FIG. 21A across lines B-B.

FIG. 21C is a partial top view of the embodiment of this invention shown in FIG. 21A.

FIG. 21D is a cross-section of the forming block shown in FIG. 21A across lines D-D.

FIG. 22A is a side view of the inflow end support assembly for the embodiment of the invention shown in FIGS. 21A through 21D.

FIG. 22B is an end view of the inflow end support assembly in FIG. 22A.

FIG. 22C is a top view of the inflow end support assembly in FIG. 22A.

FIG. 22D is an end view of the inflow end support assembly in FIG. 22A.

FIG. 24A is a side view of an overflow downdraw sheet glass forming apparatus in an embodiment of the present invention, which has a glass seal between the inflow pipe and the forming block.

FIG. 24B is a cross-section of the forming block shown in FIG. 24A across lines B-B.

FIG. 24C is a partial top view of the overflow downdraw sheet glass forming apparatus in FIG. 24A.

FIG. 24D is a cross-section of the forming block shown in FIG. 24A across lines D-D.

FIG. 25A is a side view of the inflow pipe assembly for the embodiment of the invention shown in FIGS. 24A through 24D.

FIG. 25B is a top view of the inflow pipe assembly in FIG. 25A.

FIG. 25C is a side view of the forming block in the embodiment of the invention shown in FIGS. 24A through 24D.

FIG. 25D is a top view of the forming block shown in FIG. 25C.

FIG. 26A is a side view of an embodiment of the present invention schematically illustrating the components and assembly for a forming apparatus, which provides for a change in position of the forming block relative to both the inflow end edge director and the far end edge director and adjustment means for the sheet width.

FIG. 26B is a cross-section of the forming block shown in FIG. 26A across lines B-B.

FIG. 26C is a partial top view of the embodiment of this invention shown in FIG. 26A.

FIG. 26D is a cross-section of the forming block shown in FIG. 26A across lines D-D.

FIG. 27A is a side view of another embodiment of the present invention.

FIG. 27B is a cross-section of the forming block shown in FIG. 27A across lines B-B.

FIG. 27C is a partial top view of the embodiment of this invention shown in FIG. 26A.

FIG. 27D is a cross-section of the forming block shown in FIG. 27A across lines D-D.

FIG. 29A is a side view of an embodiment of the present invention that shows compression loading of the trough bottom, which is applied by compression blocks inserted into cavities at each end of the forming block.

FIG. 29B is a cross-section of the forming block shown in FIG. 29A across lines B-B.

FIG. 29C is a top view of the embodiment shown in FIG. 29A.

FIG. 29D is a cross-section of the forming block shown in FIG. 29A across lines D-D.

FIG. 29E is a cross-section of the embodiment shown in FIG. 29C across lines E-E that shows compression loading of the trough bottom.

FIG. 30A is a side view of another embodiment of the present invention that shows multi-stage compression loading of the trough bottom.

FIG. 30B is a cross-section of the forming block shown in FIG. 30A across lines B-B.

FIG. 30C is a top view of the embodiment shown in FIG. 30A.

FIG. 30D is a cross-section of the forming block shown in FIG. 30A across lines D-D.

FIG. 30E is a cross-section of the embodiment shown in FIG. 30C across lines E-E that shows multi-stage compression loading of the trough bottom.

FIG. 31 is a magnified side view of the deformation of the forming block in an embodiment of the present invention that results from multi-stage compression loading of the trough bottom.

DETAILED DESCRIPTION OF THE INVENTION

Figures 7A, 7B, 7C, 7D, 7E, 7F:
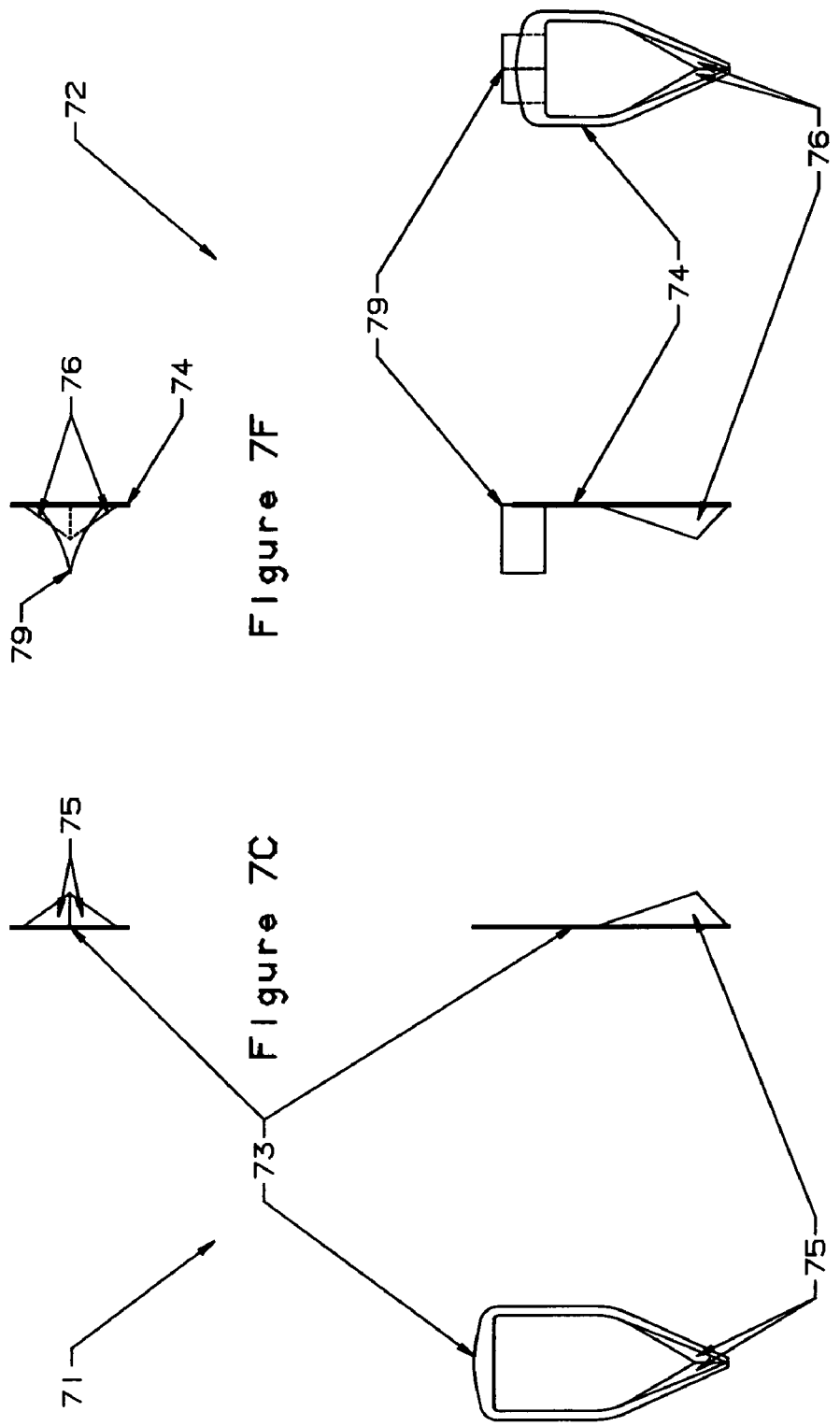
FIG. 7A is a side view of the inflow end edge director used in the embodiments of this invention shown in FIGS. 5A through 5D, FIGS. 8A through 8D, and FIGS. 9A through 9D.
FIG. 7B is an end view of the inflow end edge director in FIG. 7A.
FIG. 7C is a top view of the inflow end edge director in FIG. 7A.
FIG. 7D is a side view of the far end edge director used in the embodiments of this invention shown in FIGS. 6A through 6D and FIGS. 9A through 9D.
FIG. 7E is an end view of the far end edge director in FIG. 7D.
FIG. 7F is a top view of the far end edge director in FIG. 7D.
Figures 23A, 23B, 23C, 23D:
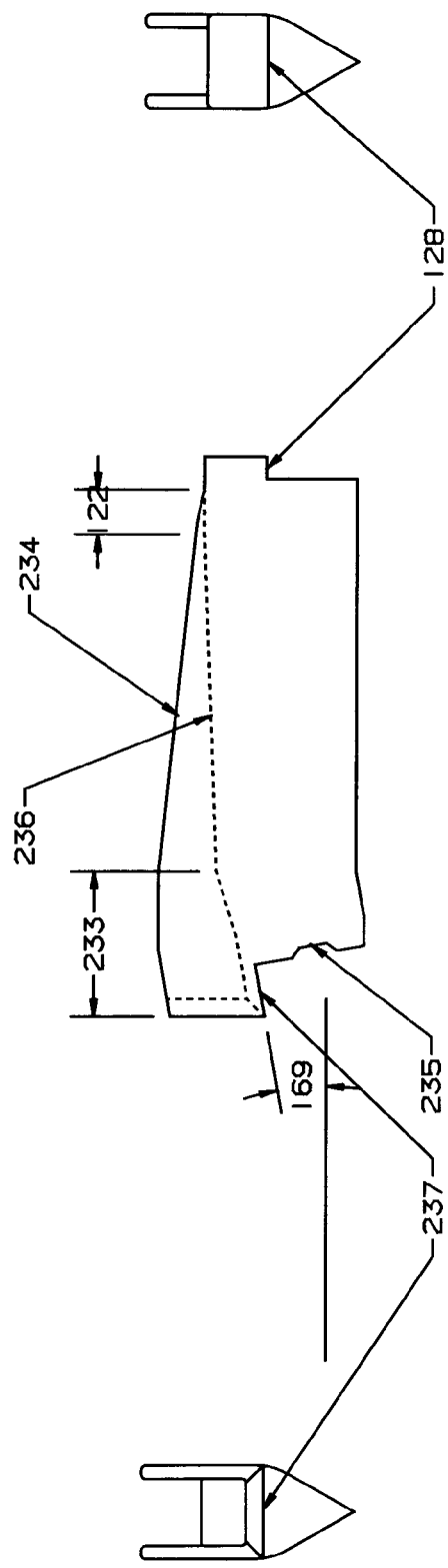
FIG. 23A is a side view of the forming block in the embodiment of the invention shown in FIGS. 21A through 21D.
FIG. 23B is an end view of the forming block shown in FIG. 23A.
FIG. 23C is a top view of the forming block shown in FIG. 23A.
FIG. 23D is an end view of the forming block shown in FIG. 23A.

The present invention is a significant modification of "The Overflow Process" that embodies design features that provide for control over the width of the manufactured glass sheet and improved control of the sheet thickness distribution.

The terms used herein have many synonymous names. A key component, the "forming block" (5) herein, is also known in the present inventor's other patent applications as a "forming apparatus", "forming apparatus body", "wedge shaped forming device", "sheet forming trough", "overflow trough", "forming wedge", "forming trough", and "trough". U.S. Pat. No. 3,338,696 uses the terms "forming device", "wedge-shaped body portion", and "cuneiform body portion". U.S. Pat. No. 3,451,798 uses the term "forming wedge" and U.S. Pat. No. 3,519,411 uses the term "forming member". A typical term in patent applications assigned to Corning, Inc. is "isopipe". The "inflow pipe" (8) herein has been called the "inlet pipe" by this inventor in previous patent applications. U.S. Pat. No. 3,338,696 uses the term "feed pipe", while U.S. Pat. No. 3,451,798 uses the term "delivery passage". This plurality of terminology stems from many people in several countries and the vernacular of the factory floor.

The glass sheet forming apparatus normally designed for use in the overflow process (U.S. Pat. No. 3,338,696) relies on a specifically shaped trough in a forming block to distribute the glass in a manner to form sheet of a uniform thickness. The basic shape of this trough and forming block is described in detail in U.S. Pat. No. 3,338,696.

Control of Sheet Width

U.S. Pat. No. 3,451,798 teaches edge directors which are attached to each end of the forming block. The sheet glass forming process is conducted at elevated temperatures, typically between 1000° C. and 1350° C. At these temperatures the material used for construction of the forming block exhibits a property called thermal creep, which is deformation of the material cause by applied stress at elevated temperatures. Thus, the forming block sags under the stress caused by its own weight and the stress caused by the hydrostatic pressure of the glass in the trough and on the outside of the forming block. U.S. patent application Ser. No. 10/214,904, by the present inventor and herein incorporated by reference, teaches a counteracting force introduced to prevent the trough sag, however, this force causes a change in length of the forming block and a subsequent narrowing of the width of the glass sheet manufactured. This change in length/width becomes significant as the technology of applying the counteracting force lengthens the life of a production campaign.

This invention introduces a method to keep the width of the manufactured sheet substantially the same by attaching edge directors for the formed sheet to the manufacturing apparatus structure instead of to the forming block. Thus, sheet glass may be manufactured to specification for a longer time with the same forming block.

This invention additionally introduces a method to adjust the width of the manufactured sheet by changing the distance between the edge directors. Thus sheet glass may be manufactured to different width specifications with the same forming block. The present invention also minimizes thermal creep.

The width of the formed sheet is proportional to the distance between the edge directors. If the edge directors remain the same distance apart over time, the width of the manufactured sheet will be substantially constant. If the distance between the edge directors is adjustable the width of the manufactured sheet may be changed.

Referring to FIGS. 5A through 5D, an embodiment of this invention shows a forming apparatus (50) with a novel forming block (51). The forming block (51) has an inflow end extension (57) that protrudes through the center of a revised inflow end edge director (71). The force motor (38) is moved to the inflow end, and the adjustment device (34) is moved to the far end. In a preferred embodiment, the adjustment device (34) is an adjusting screw. The inflow end support and compression block (52), the force motor (38), and the inflow end support structure (53) are modified to accommodate this inflow end extension (57), and the inflow end support structure (53) is also modified to structurally support the inflow end edge director (71) at the location (59). The far end support structure (55) is substantially the same as the prior art inflow end structure and uses the prior art far end edge director (42). The inflow end support structure (53) and the far end support structure (55) are preferably attached to the stationary apparatus support structure such that they are fixed in space.

The force motor (38) applies the compression force (26) to the forming block (51), which is restrained at the far end by the adjustment device (34). The compression force (26) shortens the forming block (51) pushing the trough extension (57) through the fixed inflow end edge director (71). Since the fixed far end edge director (42) and the inflow end edge director (71) remain the same distance apart, the sheet width remains substantially the same. Shortening of the forming block (51) has a small effect on the flow characteristics of the glass flowing through the trough to the far end; however, it has a larger effect at the inflow end. Because of this, the shape of the trough weirs (54) and the trough bottom (56) are changed to a compromise design such that glass within the required thickness distribution specification is manufactured for the increased duration of the production campaign. The trough bottom (56) would most likely be deeper at the inflow end, and a corresponding modification to the inflow pipe (58) is likely. In this embodiment, the inflow pipe (58) is fixed to the forming block (51) and thus moves longitudinally (36) relative to the inflow end support structure (53) as the trough extension (57) moves through the fixed inflow end edge director (71).

Referring to FIGS. 6A through 6D, an embodiment of this invention shows a forming apparatus (60) with a novel forming block (61). The forming block (61) has a far end extension (67) that protrudes through the center of the far end edge director (72). The far end support and compression block (62) and the force motor (38) are modified to accommodate this extension (67). The far end support structure (65) is also modified to accommodate this far end extension (67) and to structurally support the far end edge director (72) at the location (69). The inflow end support structure (33) is substantially the same as used in the prior art and uses the prior art inflow end edge director (41). The inflow end support structure (33) and the far end support structure (65) are preferably attached to the stationary apparatus support structure such that they are fixed in space.

The force motor (38) applies the compression force (26) to the forming block (61), which is restrained at the inflow end by the adjustment device (34). The compression force (26) shortens the forming block (61) pushing the trough extension (67) through the fixed far end edge director (72). Since the fixed far end edge director (72) and the inflow end edge director (41) remain the same distance apart, the sheet width remains substantially the same. Shortening of the trough alters the flow characteristics of the glass flowing through the trough to the far end. Because of this, the shape of the trough weirs (64), the trough bottom (66), and the edge director plow (79) are changed to a compromise design such that glass within the required thickness distribution specification is manufactured for the increased duration of the production campaign. In a preferred embodiment, the trough bottom (66) is horizontal in the region below the plow (79) to accommodate relative movement, and the top surface of the weirs (64) is curved to compensate for the flat trough bottom (66). In this embodiment the inflow pipe (68) is fixed to the forming block (61) and thus remains substantially fixed relative to the inflow end support structure (33) as the trough extension (67) moves longitudinally (36) through the far end edge director (72).

FIGS. 7A through 7F show the edge directors in the embodiments of the invention shown in FIGS. 5A through 5D, FIGS. 6A through 6D, FIGS. 8A through 8D, FIGS. 9A through 9D, and FIGS. 19A through 19D. FIGS. 7A through 7C show side, end, and top views of the inflow edge director (71). The inflow edge director (71) has a fence (73) to which the glass attaches such that the width is maintained. Symmetrical edge director surfaces (75) provide for gravity to assist the flowing glass to attach to the fence. The fence (73) and the surfaces (75) are substantially the same as the fence (43) and surfaces (45) of the prior art edge director (41). The flanges (47) of the prior art edge director (41) are deleted. FIGS. 7D through 7F are side, end, and top views of the far edge director (72). The far end edge director (72) has a fence (74) to which the glass attaches such that the width is maintained. Symmetrical edge director surfaces (76) provide for gravity to assist the flowing glass to attach to the fence. The fence (74) and the surfaces (76) are substantially the same as the fence (44) and the surfaces (46) of the prior art edge director (41). The flanges (48) of the prior art edge director (42) are deleted. Attached to the far end edge director (72) is the plow (79). The plow (79) is of substantially different shape than the plow (49) of the prior art far end edge director (42), as it must be a compromise design configured to operate for a range of horizontal positions relative to the forming trough (61).

Referring to FIGS. 8A through 8D, an embodiment of this invention shows a forming apparatus (80) with a forming block (81) configuration, which has an inflow end extension (57), that protrudes through the center of the inflow end edge director (71). This forming block (81) has a flexible joint (82) connecting the forming block (81) to the inflow pipe (88). The inflow pipe (88) is fixed to the inflow end support structure (83) at a point (89) so that it does not move as the trough becomes shorter because of thermal creep. The inflow end support structure (83) and the far end support structure (55) are preferably attached to the stationary apparatus support structure such that they are fixed in space. Although the flexible joint (82) is illustrated as a bellows, other configurations including a glass seal are within the scope of the present invention. The joint (82) is preferably made of platinum. Platinum is very ductile at the temperature of operation of the forming apparatus. Thus, as the inflow end extension (57) is pushed through the inflow end edge director (71), the platinum in the flexible joint (82) changes shape to accommodate the longitudinal (36) movement of the forming block (81) relative to the inflow pipe (88).

Referring to FIGS. 9A through 9D, an embodiment of this invention shows a forming apparatus (90) with a forming block (91) configuration, which has an inflow end extension (57) that protrudes through the center of the inflow end edge director (71) and a far end extension (67) that protrudes through the center of the far end edge director (72). The shape of the trough weirs (94), the trough bottom (96), and the edge director plow (79) are changed to a compromise design such that glass within the required thickness distribution specification is manufactured for the increased duration of the production campaign. The trough bottom (96) is deeper at the inflow end, which would most likely require reshaping of the inflow pipe (98). The inflow end support structure (53) and the far end support structure (95) are preferably attached to the stationary apparatus support structure such that they are fixed in space. The force motors (38) apply force (26) to each end of the trough to counteract the gravitational sagging effect of thermal creep shown in FIG. 2A. The force (26) moves the inflow end extension (57) and the far end extension (67) through their respective edge directors (71) and (72) as the forming block becomes longitudinally (36) shorter as shown in FIG. 2B. The adjustment mechanism (97), which attaches to the trough (91) at a point (99), positions the trough (91) longitudinally (36) relative to the far end support structure (95). Adjustment of the forming block (91) longitudinally (36) relative to the fixed position of the edge directors (71) and (72) provides an important additional degree of thickness distribution control of the formed sheet. In contrast, in the prior art, the most significant tool for adjusting the sheet thickness distribution was the horizontal tilt of the forming block (91), i. e. lowering or raising the far end of the forming block (91).

The illustrations of the support of the inflow end edge director (71) by the inflow end support structure (53) at the location (59) in FIG. SA, the support of the far end edge director (72) by the far end support structure (65) at the location (69) in FIG. 6A, the support of the inflow end edge director (71) by the inflow end support structure (83) at the location (59) in FIG. 8A, the support of the inflow pipe (88) by the inflow end support structure (83) at the point (89) in FIG. 8A, the support of inflow end edge director (71) by the inflow end support structure (53) at the location (59) in FIG. 9A, and the support of the far end edge director (72) by the far end support structure (95) at the location (69) in FIG. 9A are schematic. When implemented during the manufacturing process, the support would be more robust.

FIGS. 10A through 10D show an embodiment of a forming apparatus (100) of the present invention. The forming apparatus (100) includes the inflow end support assembly (111) shown in FIGS. 11A through 11D, the far end support assembly (112) shown in FIGS. 11E through 11H, and the sheet forming block (121) shown in FIGS. 12A through 12D. The inflow end support assembly (111) and the far end support assembly (112) are attached to the stationary apparatus support structure such that they are fixed in space. The surface (127) of the forming block (121) rests on the surface (117) of the inflow end support assembly (111), and the surface (128) of the forming block (121) rests on the surface (118) of the far end support assembly (112).

The forming block (121) is restrained longitudinally (36) by the compression blocks (101) and (102). The far end compression block (102) is positioned by the adjustment device (34). The inflow end compression block (101) is loaded by the force motor (38), which exerts a force (26) to maintain the bottom of the forming block (121) in compression. The forming block (121) becomes shorter via thermal creep under the influence of the force (26). This shortening of the forming block (121) changes the flow patterns of the glass such that the sheet thickness profile is altered. Tilting the forming apparatus will compensate for a major part of this thickness profile change. The longitudinal (36) position of the forming block (121) in the end support assemblies (111) and (112) may be adjusted using the adjustment device (34) to provide additional adjustment options for the thickness profile. Most importantly, the width of the sheet does not change as the forming block (121) becomes shorter because the distance between the edge director surfaces (113) and (114) remains constant since they are part of the fixed end support assemblies (111) and (112).

FIGS. 11A through 11D show the inflow end support assembly (111) which includes an inflow pipe (8), symmetrical edge director surfaces (115), surface (113), and a support block surface (117). FIGS. 11E through 11H show the far end support assembly (112) which includes an integrated far end plow (119), symmetrical edge director surfaces (116) and a support block surface (118). The end support assemblies (111) and (112) are preferably made of refractory material such as siliminite, zircon, or alumina. In one embodiment, the inflow support assembly may require a platinum sheet to fabricate the inflow pipe and glass contact portion of the assembly. The edge director surfaces (115) and (116) may be fabricated separately from the platinum sheet as in the prior art and attached to the respective end support assemblies (111) and (112), or they may be formed as an integral part of the refractory of each assembly. If formed as an integral part of the respective assemblies, the edge director surfaces may be made more durable by either cladding with platinum sheet or coating with platinum via flame spraying.

The surface (113) of the inflow end support assembly (111) acts similarly to the fence (43) used in the prior art and is shaped to perform the same function. The surface (114) of the far end support assembly (112) acts similarly to the fence (44) used in the prior art and is shaped to perform the same function. In the prior art the inflow pipe (8), the inflow end edge director (41), the inflow end support and compression block (31), the far end plow (49), the far end edge director (42), and the far end support and compression block (32) are all separate elements.

FIG. 12A through 12D detail the forming block (121) of the embodiment of this invention shown in FIGS. 10A through 10D. The forming block (121) is designed to be supported by the inflow end support assembly (111) on the surface (127) at the inflow end and the far end support assembly (112) on the surface (128). It is adjustable longitudinally (36) in the end support assemblies (111) and (112) by the adjustment device (34). The requirement for longitudinal (36) adjustment requires special shaping of the weirs (124) and the trough bottom (126). The inflow end (123) of the trough bottom (126) requires a unique contour to accommodate the adjustment relative to the inflow end support assembly (111) and preferably is chamfered for smooth glass flow. The far end (122) of the trough bottom (126) must be horizontal to accommodate adjustability under the plow (119). This may require that the shape of the weirs (124) be curved at the far end (122).

FIGS. 13A through 13D show an additional embodiment of the present invention. The forming apparatus (130) includes the trough shaped integrated inflow end support assembly (151) shown in FIGS. 15A through 15C, the far end support assembly (112) shown in FIGS. 11E through 11H, and the sheet forming block (121) shown in FIGS. 12A through 12D. The surface (127) of the forming block (121) rests on the surface (153) of the inflow end support assembly (151), and the surface (128) of the forming block (121) rests on the surface (118) of the far end support assembly (112). The inflow end support assembly (151) and the far end support assembly (112) are preferably attached to the stationary apparatus support structure such that they are fixed in space.

The glass in the inflow end support assembly (151) is a free surface (132). The bottom end (17) of the downcomer pipe (7) is shown below the free surface (132). The bottom end (17) may also terminate above the free surface (132) as described in detail in patent application Ser. No. 10/214,904, filed Aug. 8, 2002, and patent application Ser. No. 10/771,761, filed Feb. 4, 2004, by the inventor of the present invention, and herein incorporated by reference. The attributes of this embodiment are the same as for the embodiment discussed for FIGS. 10A through 10D except for those attributes affected by the different inflow end support assembly (151).

FIGS. 14A through 14D show another embodiment of this invention. The forming apparatus (140) includes the trough shaped integrated inflow end support assembly (151) shown in FIGS. 15A through 15C, the far end support assembly (112) shown in FIGS. 11E through 11H, the sheet forming block (121) shown in FIGS. 12A through 12D and the modified downcomer pipe (157) shown in FIGS. 15D through 15F. This embodiment is the same as that in FIGS. 13A through 13D except for the use of downcomer pipe (157) instead of downcomer pipe (7). The glass in the inflow end support assembly (151) is a free surface (142). The purpose of the downcomer pipe (157) is to produce a finer surface on the manufactured glass sheet. The attributes of this embodiment are the same as for the embodiment discussed for FIGS. 13A through 13D except for those attributes affected by the different downcomer pipe (157).

FIGS. 15A through 15C show the inflow end support assembly (151), which includes an integrated inflow trough (158), symmetrical edge director surfaces (115) and a support block surface (153). The inflow trough (158) shape for receiving glass from the downcomer pipes (7) and (157) is less complicated than the enclosed platinum pipe (8) of the prior art and the enclosed pipe (118) of the inflow end support assembly (111) in a previous embodiment. It is therefore likely to be made almost entirely from refractory, requiring less use of platinum.

FIGS. 15D through 15F show a downcomer pipe (157) which has the shape of its bottom end modified. There is a contoured section at the bottom of the downcomer pipe (157) as represented by a vertical cutaway (152) on the front of the downcomer pipe (157) and horizontal shaped plates (155) and (156) attached to the bottom of the downcomer pipe (157). The flow pattern of the glass in the embodiment of FIGS. 13A through 13D is such that much of the glass which forms the surface of the sheet flows down the front surface of the downcomer pipe (7) and is thus potentially less homogeneous than the glass from the center of the glass stream, which forms the surface of the sheet with the use of the downcomer pipe (157). These modifications redistribute the flow from the downcomer pipe (157) to the forming block (121) such that the glass which forms the surface of the sheet is glass from the interior of the flow stream in the downcomer pipe (157). The glass from the front surface is diverted to the unused inflow end edge of the sheet.

FIGS. 16A through 16D show another embodiment of the present invention. The forming apparatus (160) includes the inflow end support assembly (171) shown in FIGS. 17A through 17D, the far end support assembly (112) shown in FIGS. 11E through 11H, and the sheet forming block (181) shown in FIGS. 18A through 18D. The inflow end support assembly (171) and the far end support assembly (112) are preferably attached to the stationary apparatus support structure such that they are fixed in space. The surface (187) of the forming block (181) rests on the surface (177) of the inflow end support assembly (171), and the surface (128) of the forming block (181) rests on the surface (118) of the far end support assembly (112).

The forming block (181) is restrained longitudinally (36) by the compression blocks (161) and (102). The far end compression block (102) is positioned by the adjustment device (34). The inflow end compression block (161) is mounted at an angle (169) with respect to the horizontal and is loaded by the force motor (38), which exerts a force (165) to maintain the bottom of the forming block (181) in compression. The force (165) and the angle (169) are selected to meet the requirements for the longitudinal force (26) and the vertical force (167). The longitudinal force (26) is required to be sufficient to prevent the forming block (181) from sagging via thermal creep. The vertical force (167) is designed to support most of the weight of the trough at the surface (177). This minimizes the longitudinal (36) friction force between surfaces (177) and (187) and allows the longitudinal force (26) to accurately control the prevention of the sagging of the forming block (181).

The forming block (181) will become shorter via thermal creep under the influence of the force (26). Shortening of the forming block causes the point (185) to move longitudinally (36) to the right causing the angle (169) to change if the force motor anchor point (163) is fixed. The angle (169) may be maintained substantially constant by providing for periodic vertical adjustment of the force motor anchor point (163). The shortening of the forming block (181) changes the flow patterns of the glass such that the sheet thickness profile is altered. Tilting of the forming apparatus will compensate for a major part of this thickness profile change. The longitudinal (36) position of the forming block (181) in the end support assemblies (171) and (112) may be adjusted using the adjustment device (34) to provide additional adjustment options for the thickness profile. Most importantly, the width of the sheet does not change as the forming block (181) becomes shorter because the distance between the edge director surfaces (113) and (114) remains constant since they are part of the fixed end support assemblies (171) and (112).

FIGS. 17A through 17D show the inflow end support assembly (171), which includes an integrated inflow pipe (8), symmetrical edge director surfaces (115) and a support block surface (177). The end support assembly (171) is preferably made of refractory material such as siliminite, zircon, or alumina. In one embodiment, the inflow end support assembly (171) may require platinum sheet to fabricate the inflow pipe and glass contact portion of the assembly. The edge director surfaces (115) may be fabricated from platinum sheet as in the prior art and attached to the respective end support assembly (171). Alternatively, it may be formed as an integral part of the refractory of the assembly. If formed as an integral part of the respective assemblies, the edge director surfaces may be made more durable by either cladding with platinum sheet or coating with platinum via flame spraying. The surface (173) of the inflow end support assembly (171) acts the same as the fence (43) used in the prior art and is shaped to perform the same function. In the prior art, the inflow pipe (8), the inflow end edge director (41), and the inflow end support and compression block (31) were all separate elements.

FIG. 18A through 18D detail the forming block (181) of the embodiment of this invention shown in FIGS. 16A through 16D. The forming block (181) is designed to be supported by the inflow end support assembly (171) on the surface (187) at the inflow end and the far end support assembly (112) on the surface (188). It is adjustable longitudinally (36) in the end support assemblies (171) and (112) by the adjustment device (54). The requirement for longitudinal (36) adjustment requires special shaping of the weirs (184) and the trough bottom (186). The inflow end (183) of the weirs (184) and of the trough bottom (186) requires a unique contour to accommodate the adjustment relative to the inflow end support assembly (171) and preferably is chamfered for smooth glass flow. The far end (122) of the trough bottom (186) must be horizontal to accommodate adjustability under the plow (119). This may require that the shape of the weirs (184) be curved at the far end (122). The compression surface (185) of the forming block (181) has a radius to accommodate a wide range of the angle (169).

FIGS. 19A through 19D show a forming apparatus (190) in an embodiment of the present invention, which is a simplified version of the forming apparatus (160) shown in FIGS. 16A through 16D. This embodiment includes the inflow end support assembly (171) shown in FIGS. 17A through 17D, the far end edge director assembly (42) shown in FIGS. 4D through 4F, and the sheet forming block (201) shown in FIGS. 20A through 20D. The inflow end support assembly (171) and the far end support structure (55) are attached to the stationary apparatus support structure such that they are fixed in space. The surface (187) of the forming block (201) rests on the surface (177) of the inflow end support assembly (171), and the surface (208) of the forming block (201) rests on surface (198) of the far end support and compression block (32).

The forming block (201) is restrained longitudinally (36) by the far end support and compression block (32) and the far end edge director assembly (42), which are positioned longitudinally (36) by the adjusting bolt (34). The inflow end compression block (191) is mounted at an angle (169) with respect to the horizontal and is loaded by the force motor (38), which exerts a force (165) to maintain the bottom of the forming block (201) in compression. The force (165) and the angle (169) are selected to meet the requirements for the longitudinal force (26) and the vertical force (167). The longitudinal force (26) is required to be sufficient to prevent the trough from sagging via thermal creep. The vertical force (167) is required to support most of the weight of the forming block at surface (177). This minimizes the longitudinal (36) friction force between the surfaces (177) and (187) and allows the longitudinal force (26) to accurately control the prevention of the sagging of the forming block.

The forming block (201) will become shorter via thermal creep under the influence of the force (26). This shortening of the forming block (201) changes the flow patterns of the glass such that the sheet thickness profile is altered. Although in this embodiment the longitudinal (36) position of the forming block (201) relative to the edge director (42) is fixed, tilting of the forming apparatus will compensate for a major part of this thickness profile change. This embodiment is capable of making a sheet of varying width. The adjustment bolt (34) can be used to change the distance between the edge director surface (113) and the fence (44), thus changing the width of the formed glass sheet.

FIGS. 20A through 20D show the forming block (201) used in FIGS. 19A through 19D. It has an inflow end (183) of the weirs (204) and the trough bottom (206) similar to the forming block (181) used in FIGS. 16A through 16D and a far end (202) similar to that used in the prior art. Note the keyway in surface (205) which has a radius to keep the compression block (191) in place.

FIGS. 21A through 21D show another embodiment of the present invention. The forming apparatus (210) includes the inflow end support assembly (221) shown in FIGS. 22A through 22D, the far end support assembly (112) shown in FIGS. 11E through 11H, and the sheet forming block (231) shown in FIGS. 23A through 23D. The inflow end support assembly (221) and the far end support assembly (112) are preferably attached to the stationary apparatus support structure such that they are fixed in space. The surface (237) of the forming block (231) rests on the surface (227) of the inflow end support assembly (221), and the surface (128) of the forming block (231) rests on the surface (118) of the far end support assembly (112).

This embodiment is the same as the embodiment shown in FIGS. 16A through 16D, except that the surfaces (227) and (237) are angled at the angle (169) relative to the horizontal. This allows the attachment point (213) of the force motor (38) to be fixed. As the forming block (231) becomes shorter via thermal creep the surface (235) moves up and to the right, thus the angle (169) remains constant.

FIGS. 22A through 22D show the inflow end support assembly (221) used in the embodiment of FIGS. 21A through 21D. It is the same as the inflow end support assembly shown in FIGS. 17A through 17D except that the bottom support surface (227) is at an angle (169) relative to the horizontal and the top surface (223) has a different special shape. The top surface may have an angle (229) relative to the horizontal which is different than the angle (169).

FIG. 23A through 23D detail the forming block (231) of the embodiment of this invention shown in FIGS. 21A through 21D. It is designed to be supported by the inflow end support assembly (221) on the surface (227) at the inflow end and the far end support assembly (112) on the surface (118). The surface (237) is angled at an angle (169) relative to the horizontal. The top surface of the weir (234) and the trough bottom (236) at the inflow end (233) of the trough has a special shape including curved weirs to compensate for the changing flow pattern at the inflow end (233) caused by longitudinal (36) shrinkage of the forming block (231). The compression surface (235) of the forming block (231) is keyed to maintain the compression block (211) at the specified angle (169).

FIGS. 24A through 24D show another embodiment of the present invention. The forming apparatus (240) includes the inflow end support assembly (250) shown in FIGS. 25A and 25B, the sheet forming block (251) shown in FIGS. 25C through 25D, the inflow end edge director (71) shown in FIGS. 7A through 7C, the prior art far end edge director (42) shown in FIGS. 4D through 4F, and the prior art far end support structure assembly components (32) and (55) shown in FIGS. 5A through 5D. The forming block (251) has an inflow end extension (57) that protrudes through the center of the inflow end edge director (71). The edge director (71) is attached at a point (249) to the adjustment bolt (244), which provides for the longitudinal (36) adjustment of the edge director (71) relative to the forming bock (251). The forming block (251) also has an extended inflow (252) with an external surface (253) that fits into the internal surface (257) at the exit (255) of the inflow end support assembly (250). A glass seal between the internal surface (257) and the forming block external surface (253) allows movement of the forming block (251) relative to the inflow end support assembly (250). The inflow end support assembly (250) is fixed to the inflow end support structure (243) at point (248) so that it does not move as the inflow end extension (252) of the forming block (251) moves longitudinally (36) because of thermal creep or adjustment. The inflow end support assembly (243) and the far end support structure (55) are preferably attached to the stationary apparatus support structure such that they are fixed in space.

The far end support structure (55) is substantially the same as the prior art inflow end support structure (33) and uses the prior art far end edge director (42). The far end of the forming block (251) rests on the far end support and compression block (32), which is restrained and positioned longitudinally (36) by the adjustment bolt (34). The distance between the inflow end edge director fence (73) and the far end edge director fence (44) is adjusted by the adjustment bolt (244) at the inflow end and the adjustment bolt (34) at the far end. Thus, this embodiment facilitates adjustment of the sheet width at both the inflow end and at the far end.

FIGS. 25A and 25B show the inflow end support assembly (250) used in the embodiment of FIGS. 24A through 24D. It has a prior art inflow pipe (8) integrated with the extension (255), which has an internal surface (257) that matches the external surface (253) of the forming block (251), supports the weight of the forming block (251), and provides for a glass seal.

FIGS. 25C and 25D detail the forming block (251) of the embodiment of the invention shown in FIGS. 24A through 24D. The forming block (251) is designed to be supported by the inflow end support assembly (250) by the internal surface (257) at the inflow end and at the far end by support and compression block (32). The external surface (253) of the inflow extension (252) fits into the extension (255) forming a glass seal, which provides for movement relative to the inflow end support assembly (250). The top surface of the weir (254) and the trough bottom (256) are shaped to provide glass flow that produces substantially uniform glass thickness for the desired range of adjustment.

FIGS. 26A through 26D show an additional embodiment of the present invention. This embodiment is the same as that shown in FIGS. 13A through 13D except for the added feature, which provides for adjustability of the sheet width. The forming apparatus (260) includes the trough shaped integrated inflow end support assembly (151) shown in FIGS. 15A through 15C, the far end support assembly (112) shown in FIGS. 11E through 11H, and the sheet forming block (121) shown in FIGS. 12A through 12D. The surface (127) of the forming block (121) rests on the surface (153) of the inflow end support assembly (151) and the surface (128) of the forming block (121) rests on the surface (118) of the far end support assembly (112).

The inflow end support assembly (151) is mounted to the stationary apparatus support structure at the location (269) by the adjustment device (268). The far end support assembly is mounted to the stationary apparatus support structure at the location (265) by the adjustment device (264). The inflow end support assembly (151) can be adjusted longitudinally (36) by the adjustment device (268). The far end support assembly (112) can be adjusted longitudinally (36) by the adjustment device (264). These adjustments allow the edge director surfaces (113) and (114) to be moved longitudinally (36) relative to each other thus allowing the width of the sheet to be adjusted.

FIGS. 27A through 27D describe another embodiment of this invention whereby the forming block may be made from molybdenum without the necessity of completely cladding the molybdenum forming block in platinum. Molybdenum is strong and more resistant to thermal creep than zircon and other refractory materials, however, it is subject to extreme oxidation at elevated temperatures. The oxidation of the molybdenum may be prevented by either cladding the molybdenum body in platinum or completely immersing the molybdenum body in a glass which is compatible with molybdenum. Although molybdenum is used when describing this embodiment, other oxidizing materials could be substituted for the molybdenum, to similarly make the apparatus more resistant to thermal creep.

The inflow end support assembly (111) in the forming apparatus (270) is designed with a gap between it and the forming block (121) except at the support surface (127). The far end support assembly (112) is designed with a gap between it and the forming block (121) except at the support surface (128). This allows glass to completely envelop the forming block (121) except at the support surfaces (127) and (128) and at the locations where compression blocks (101) and (102) apply the compression force (26) to the forming block (121). A glass seal is required at the location (271) between inflow end compression block (101) and the forming block (121) and at the location (272) between far end compression block (102) and the forming block (121). The glass seal prevents the intrusion of oxygen and still allows movement of the compression blocks to counter the thermal creep deformation of the forming block (121). The forming block (121) could be coated with a glass before assembly to protect the molybdenum from oxidation during start-up operation. Any number of other procedures, which the glass industry has developed to protect the molybdenum from oxidation before the production glass envelops the molybdenum, may be used for start-up.

Localized platinum cladding may be used to protect the molybdenum at critical locations. For example, platinum may be used in the area of the glass seal at compression blocks (101) and (102), the support surfaces (127) and (128), and at other locations depending on the specific design features.

The glass seals (271) and (272) are preferably at locations where the gap between components of the apparatus is large enough for glass to flow in this gap from the inside of the apparatus to the outside of the apparatus. Glass seals may exist at specific locations in any of the embodiments herein. The seal comprises the glass being cooled until it either has a very high viscosity or is solidified. In the glass apparatus (270) the viscosity of the glass in the glass seals (271) and (272) must be between the annealing point and the softening point so as not to impede the application of the longitudinal force (26) to the forming block (121). The glass annealing point is defined as a glass viscosity of $10^{12.4}$ poise which is the condition where the internal stress in the glass is substantially relieved in 15 minutes. The glass softening point is defined as a glass viscosity of $10^{7.6}$ poise which is the condition where the glass will deform under its own weight. The seal may include glass soft enough such that a small quantity of glass oozes from the gap. Alternatively the viscosity of the glass in the glass seals (271) and (272) may be below the softening point of glass, where substantial glass would ooze from the gap and provisions for removal and disposal would be required.

All of the embodiments of this invention, (50), (60), (80), (90), (100), (130), (140), (160), (190), (210), (240), (260), and (270), have a forming apparatus design that will manufacture sheet glass of the same width and thickness profile for the full production campaign even though the forming blocks (51), (61), (81), (91), (121), (181), (201), (231), and (241) become substantially shorter in length (via thermal creep) under the influence of a compression force (26), which is required to prevent the forming block from sagging vertically via the influence of gravity on its own weight. Additionally, the forming apparatuses (50), (60), (80), (190), (240), and (260) are able to adjust the width of the manufactured sheet (10).

The embodiments of this invention may be categorized in three groups relative to their ability to maintain the sheet thickness profile within the required specification limits. Group one includes the forming apparatus (60), group two includes the forming apparatuses (50), (80), (190) and (240) and group three includes the forming apparatuses (90), (100), (130), (140), (160), (210), (260), and (270).

The forming apparatus (60) provides for the length change compensation only at the far end of the forming block (61). This embodiment is inherently the least effective in maintaining a uniform sheet thickness, since the glass for the far end must flow through the full length of the trough in the forming block (61). A compromise design of the weirs (64), the trough bottom (66) and the plow (79) is required to maintain the sheet thickness within specification. This embodiment would likely be the easiest to implement in production as it is the most similar to prior art.

Forming apparatuses (50), (80), (190), and (240), provide for the length change compensation only at the inflow end of the forming block (51), (81), (201), and (241), respectively. These embodiments are inherently more effective than the forming apparatus (60) in maintaining a uniform sheet thickness as the inflow end weir and the trough bottom may be modified such that the newly exposed section of the weir has the correct flow without materially affecting the flow through the full length of the trough in the forming block. This concept is verified by the calculations taught by Dockerty in U.S. Pat. No. 3,338,696. For example, assume a typical forming apparatus forming block 200 cm long, 15 cm wide, and with a weir slope of 5.730 degrees (0.1 radian) operating at a glass flow rate times glass viscosity of 250,000 metric ton poise per day. If the forming block becomes shorter by 5 percent (10 cm), a reduction in weir slope from 5.730 degrees to 5.460 degrees produces substantially the same thickness sheet as before the shortening of the trough. Alternately, at a constant weir slope of 5.730 degrees, an increase in the glass flow rate times glass viscosity of five percent to 262,500 metric ton poise per day also produces substantially the same thickness sheet as before the longitudinal (36) shortening of the forming block.

Forming apparatuses (90), (100), (130), (140), (160), (210), (260) and (270), provide for the length change compensation at both the inflow end and the far end of the forming blocks (91), (121), (181), and (231). These embodiments are moderately more effective than the group two forming apparatuses in maintaining a uniform sheet thickness because of the adjustment feature which allows compensation at both ends. This concept is verified by the calculations taught by Dockerty in U.S. Pat. No. 3,338,696. For example, assume a typical forming apparatus forming block 200 cm long, 15 cm wide, and with a weir slope of 5.730 degrees, operating at a glass flow rate times glass viscosity of 250,000 metric ton poise per day. If the forming block becomes shorter by 5 percent (10 cm), a reduction in weir slope from 5.730 degrees to 5.456 degrees and a longitudinal (36) adjustment toward the inflow end of 1 cm produces substantially the same thickness sheet as before the shortening of the trough. Alternately, at a constant weir slope of 5.730 degrees, an increase in the glass flow rate times glass viscosity of five percent to 262,500 metric ton poise per day also produces substantially the same thickness sheet as before the longitudinal (36) shortening of the forming block.

In forming apparatuses (90), (100), (130), (140), (160), (210), (260) and (270), deformation of the forming block (91), (121), (181), and (231) will not be completely prevented by the sag prevention technique of applying force (26) to the bottom of the forming block. Adjustment of the forming block toward the far end and tilting to a lower angle will correct a substantial amount of the sheet thickness variation caused by sagging of the forming block. This concept is verified by the calculations taught by Dockerty in U.S. Pat. No. 3,338,696. For example, assume a typical forming apparatus forming block 200 cm long, 15 cm wide, and with a weir slope of 5.730 degrees, operating at a glass flow rate times glass viscosity of 250,000 metric ton poise per day. If the forming block sags 5 mm in the center, a reduction in weir slope from 5.730 degrees to 5.157 degrees and a 10 cm longitudinal (36) adjustment of the forming block toward the far end corrects for approximately 50 percent of the sheet thickness variation caused by the sag. Alternately, at a constant weir slope of 5.730 degrees, an increase in the glass flow rate times glass viscosity of 10 percent to 275,000 metric ton poise per day produces substantially the same result.

The teachings of Dockerty in U.S. Pat. No. 3,338,696 represent the fluid flow mathematical modeling technology of his time, circa 1964. Today, "Computational Fluid Dynamics" (CFD) uses computers to accurately simulate fluid flow phenomena, and was used in developing some of the concepts herein. "Finite Element Analysis" (FEA) was used for the analysis of stress, deformation, and thermal creep in developing some of the concepts herein. More specifically, CFD2000® software and ALGOR® software were used.

Forming apparatuses (50), (60), (80), (190), (240) and (260) also provide for the adjustment of the manufactured sheet width. An adjustment range of up to 25 percent is possible. Suitable changes in the combination of weir slope and/or the parameter (glass flow rate times glass viscosity) are required to maintain a uniform sheet thickness. This capability provides for increased manufacturing efficiency.

In summary, the basic tenet of these embodiments of the present invention is that the width of the formed sheet is proportional to the distance between the edge directors. In the embodiments where the edge directors remain the same distance apart, the width of the manufactured sheet will be substantially constant. In the embodiments where the distance between the edge directors is adjustable, the width of the manufactured sheet may be changed.

Improved Control of Sheet Thickness Distribution

Figure 28:
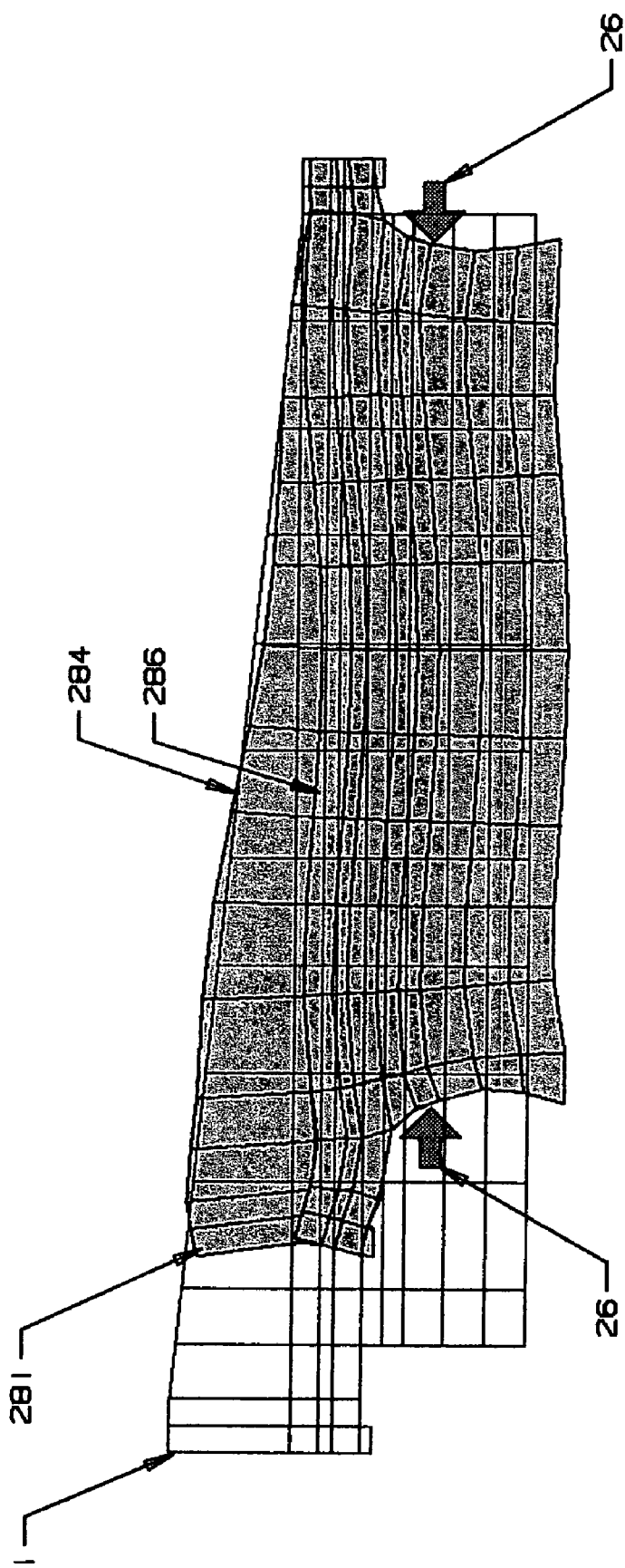
FIG. 28 is a magnified side view of the deformation of the forming block with prior art compression loading of the forming block.

FIGS. 2A through 2D illustrate the macroscopic effect of thermal creep and of compression loading to the bottom of the forming block. A more detailed analysis of the forming block (1) deformation is determined by computer simulation using FEA. FIG. 28 is the result of a FEA analysis of the application of the optimum compression loading (26) to minimize the sagging of the forming block (1). The flow distribution of the glass flowing in the deformed forming block (281) is greatly improved, however, there is still a measurable amount of distortion of the forming block (281). Shown is the deformed shape of a typical forming block (281) magnified relative to its original shape (1), when acted upon the compression load (26). The forming block weirs (284) and trough bottom (286) have a slightly distorted curved shape. These distortions produce measurable variation in sheet thickness distribution.

FIGS. 29A through 29E show an embodiment of this invention where the compression loading of the bottom of the forming block (291) is applied by compression blocks inserted into cavities at each end of the forming block. The weight of forming block (291) is carried by the support block (292) at the inflow end and the support block (297) at the far end. At the inflow end the bottom of the forming block (291) is loaded by a compression block (293) which is inserted into a cavity of a depth (295) and applies force (303) at the bottom of this cavity. At the far end the bottom of the forming block (291) is loaded by a compression block (298) which is inserted into a cavity of a depth (299) and applies force (308) at the bottom of this cavity. This configuration provides additional versatility in the application of the compression forces that counteract the gravitational force, which causes sagging of the forming block by thermal creep. In some embodiments, either the depth (295) or the depth (299) is 0, and there is a cavity at only one end.

FIGS. 30A through 30E show an embodiment of this invention where the compression loading of the bottom of the forming block (291) is applied at each end by a multi-stage loading device. At the inflow end the bottom of the forming block (291) is loaded by the compression block (305) with a force (302) and the compression block (293) with a force (303). The compression block (293) is inserted into a cavity of a depth (295) at the inflow end and applies force (303) at the bottom of this cavity. At the far end the bottom of the forming block (291) is loaded by the compression block (309) with a force (307) and the compression block (298) with a force (308). The compression block (298) is inserted into a cavity of a depth (299) at the far end and applies force (308) at the bottom of this cavity. In some embodiments, either the depth (295) or the depth (299) is 0, and there is a cavity at only one end. FIGS. 30A and 30E show the weight of the forming block (291) as being supported by the compression blocks (305) and (309). In another embodiment the weight of the forming block (291) would be supported by independent support blocks.

Normally the sum of the forces at the inflow end "(302) plus (303)" would be equal to the sum of the forces at the far end "(307) plus (308)" ; however, in some embodiments of this invention it may be necessary to have a small force (290) to seal the inflow pipe to the forming block. In this instance, the sum of the forces at the far end "(307) plus (308)" would be larger by force (290) than the sum of the forces at the inflow end "(302) plus (303)" such that:

$$F_{307}+F_{308}=F_{302}+F_{303}+F_{290}$$

In an embodiment where the cavity compression blocks are not used, forces (303) and (308) are zero. In this embodiment the seal is maintained by the force (307) being larger than force (302) such that:

$$F_{307}=F_{302}+F_{290}$$

In an embodiment where only the cavity compression blocks are used, forces (302) and (307) are zero. In this embodiment the seal is maintained by the force (308) being larger than force (303) such that:

$$F_{308}=F_{303}+F_{290}$$

In a preferred embodiment, the cavity (295) has a depth that ranges from approximately 0 to 35 percent of the length of the root. Alternatively, the cavity (295) has a depth that ranges from approximately 10 to 35 percent of the length of the root. In another preferred embodiment, the cavity (299) has a depth that ranges from approximately 0 to 35 percent of the length of the root. Alternatively, the cavity (299) has a depth that ranges from approximately 10 to 35 percent of the length of the root. If either the depth of the cavity (295) or the depth of the cavity (299) is 0, there is only one cavity on one end of the forming block. In a further preferred embodiment, the depth of the cavity (295) ranges from approximately 20 to 25 percent of the root and the depth of the cavity (299) ranges from approximately 20 to 25 percent of the length of the root.

Figure 31:
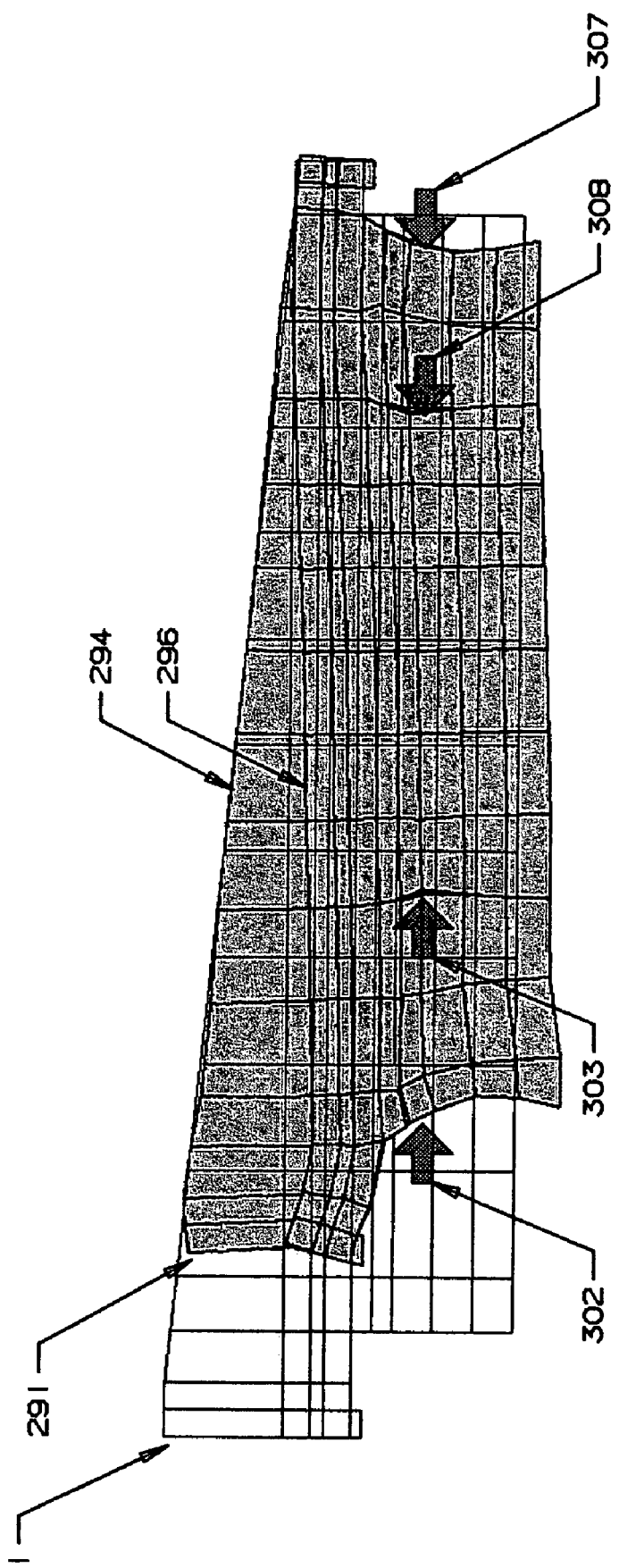

FIG. 31 shows the shape of forming block (291) magnified relative to its original shape (1), when acted upon the compression loads (302), (303), (307), and (308). Comparison with the shape of forming block (281) in FIG. 28 shows a substantial reduction in the distortion of the weirs (294) and the trough bottom (296). The shape of the forming block (291) in FIG. 31 is visually more uniform than that of the forming block (281) in FIG. 28. To verify the effect of the revised shape on the thickness distribution of the formed sheet, the flow distribution of the glass in the deformed forming block (291) is analyzed by computer simulation using CFD. Further improvements in the flow distribution are then made via computer simulation using FEA by varying the magnitudes of the forces (302), (303), (307), and (308) and the depth and shape of cavities (295) and (299) in the forming block (291). Successive iterations of the design using FEA and then CFD produces a configuration with the most uniform glass flow distribution in the forming block resulting in a glass sheet of substantially uniform thickness over an extended period of the production campaign.

These embodiments provide additional versatility in applying compressive loads to the forming block in order to more closely control the deformation of the forming block under the influence of thermal creep.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An improved apparatus for forming sheet glass, wherein the apparatus includes an inflow pipe for delivering molten glass, a trough for receiving molten glass that has sides attached to a wedged shaped sheet forming block that has downwardly sloping sides converging at the bottom of the wedge such that a glass sheet is formed when molten glass flows over the sides of the trough, down the downwardly sloping sides of the wedged shaped sheet forming block and meets at the bottom of the wedge, wherein the improvement comprises:
   a) a first inflow end compression block inserted into a first cavity at an inflow end of the forming block; and
   b) a second far end compression block inserted into a second cavity at a far end of the forming block;
   such that a longitudinal compressive force is applied to a bottom of the first cavity and a bottom of the second cavity to counteract a thermal creep effect of a gravitational force from a weight of the forming block.

2. The improved apparatus of claim 1, wherein a depth of the first cavity and a depth of the second cavity are independent and range from 0 to 35 percent of a length of the bottom of the wedge.

3. The improved apparatus of claim 1, wherein a depth of the first cavity and a depth of the second cavity are independent and range from 10 to 35 percent of a length of the bottom of the wedge.

4. The improved apparatus of claim 1, wherein a depth of the first cavity and a depth of the second cavity are independent and range from 20 to 25 percent of a length of the bottom of the wedge.

5. The improved apparatus of claim 1, wherein the improvement further comprises a third compression block at the inflow end that applies a portion of the inflow end compression force such that a thickness profile of a glass sheet remains substantially constant.

6. The improved apparatus of claim 5, wherein the improvement further comprises a fourth compression block at the far end that applies a portion of the far end compression force such that a thickness profile of a glass sheet remains substantially constant.

7. The improved apparatus of claim 6, wherein the improvement further comprises a sum of the longitudinal forces applied to the forming block by the second compression block and the fourth compression block at the far end being greater than a sum of the longitudinal forces applied to the forming block by the compression blocks at the inflow end such that a sealing force is applied between the inflow pipe and the forming block at the inflow end.

8. The improved apparatus of claim 1, wherein the improvement further comprises a third compression block at the far end that applies a portion of the far end compression force such that a thickness profile of a glass sheet remains substantially constant.

9. The improved apparatus of claim 1, wherein the improvement further comprises the longitudinal force applied to the forming block by the second compression block at the far end being greater than the longitudinal force applied to the forming block by first compression block at the inflow end in order such that a sealing force is applied between the inflow pipe and the forming block at the inflow end.

10. An improved apparatus for forming sheet glass, wherein the apparatus includes an inflow pipe for delivering molten glass, a trough for receiving molten glass that has sides attached to a wedged shaped sheet forming block that has downwardly sloping sides converging at the bottom of the wedge such that a glass sheet is formed when molten glass flows over the sides of the trough, down the downwardly sloping sides of the wedged shaped sheet forming block and meets at the bottom of the wedge, wherein the improvement comprises:
   a) an inflow end compression block at an inflow end of the forming block; and
   b) a far end compression block at a far end of the forming block;
   wherein a far end longitudinal compression force at the far end of the forming block is larger than an inflow end longitudinal compression force such that a sealing force is applied between the inflow pipe and the forming block at the inflow end.

* * * * *